United States Patent [19]
Kobayashi et al.

[11] Patent Number: 5,645,107
[45] Date of Patent: Jul. 8, 1997

[54] HYDRAULIC PRESSURE CONTROL VALVE

[75] Inventors: Masanori Kobayashi, Yamato-Kooriyama; Yoshiyuki Saito, Kashihara; Takashi Ohata, Kashiwara; Fumiyoshi Ono, Shiki-gun; Noboru Minamoto, Ikoma-gun, all of Japan

[73] Assignee: Koyo Seiko Co., Ltd., Osaka, Japan

[21] Appl. No.: 559,138

[22] Filed: Nov. 17, 1995

[30] Foreign Application Priority Data

| Dec. 26, 1994 | [JP] | Japan | 6-323144 |
| Jul. 12, 1995 | [JP] | Japan | 7-176464 |
| Jul. 19, 1995 | [JP] | Japan | 7-183084 |

[51] Int. Cl.⁶ .............................. F15B 9/10; F15B 13/04
[52] U.S. Cl. ................. 137/625.23; 91/375 A; 137/625.24
[58] Field of Search ............... 91/375 A; 137/625.23, 137/625.24

[56] References Cited

U.S. PATENT DOCUMENTS 3,022,772  2/1962  Zeigler et al. .

FOREIGN PATENT DOCUMENTS

| 337723 | 10/1989 | European Pat. Off. . |
| 472101 | 2/1992 | European Pat. Off. . |
| 585107 | 3/1994 | European Pat. Off. . |
| 592095 | 4/1994 | European Pat. Off. . |
| 54-28735 | 9/1979 | Japan . |
| 57-007763 | 1/1982 | Japan . |
| 59220458 | 12/1984 | Japan . |
| 60-203580 | 10/1985 | Japan . |
| 1-43974 | 12/1989 | Japan . |
| 6-156292 | 6/1994 | Japan . |
| 6-206555 | 7/1994 | Japan . |
| 6-278623 | 10/1994 | Japan . |
| 2112332 | 7/1983 | United Kingdom . |
| WO/A/8605753 | 10/1986 | WIPO . |

*Primary Examiner*—Gerald A. Michalsky
*Attorney, Agent, or Firm*—Darby & Darby

[57] ABSTRACT

A hydraulic pressure control valve includes a cylindrical valve body and a valve spool coaxially fitted therein, each having oil grooves and lands alternately provided on and along the respective peripheral inside and outside surfaces, the opposing oil grooves and lands having throttles therebetween whose throttling extent, are changeable in accordance with a relative angular displacement between the valve body and the valve spool such that the flow of a working oil is concentrated in wider throttles. Thus noise due to cavitation is reduced.

32 Claims, 33 Drawing Sheets

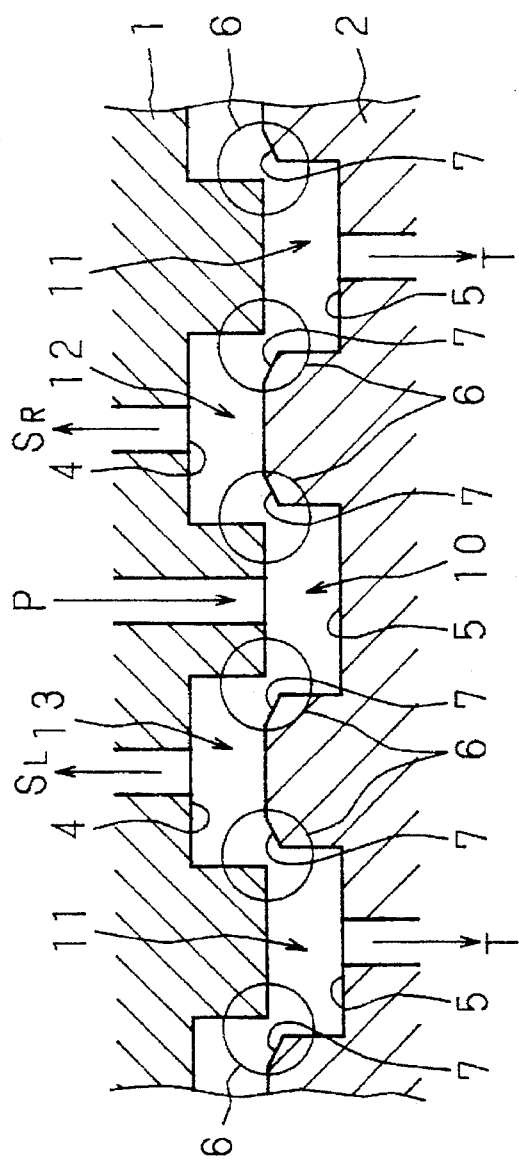
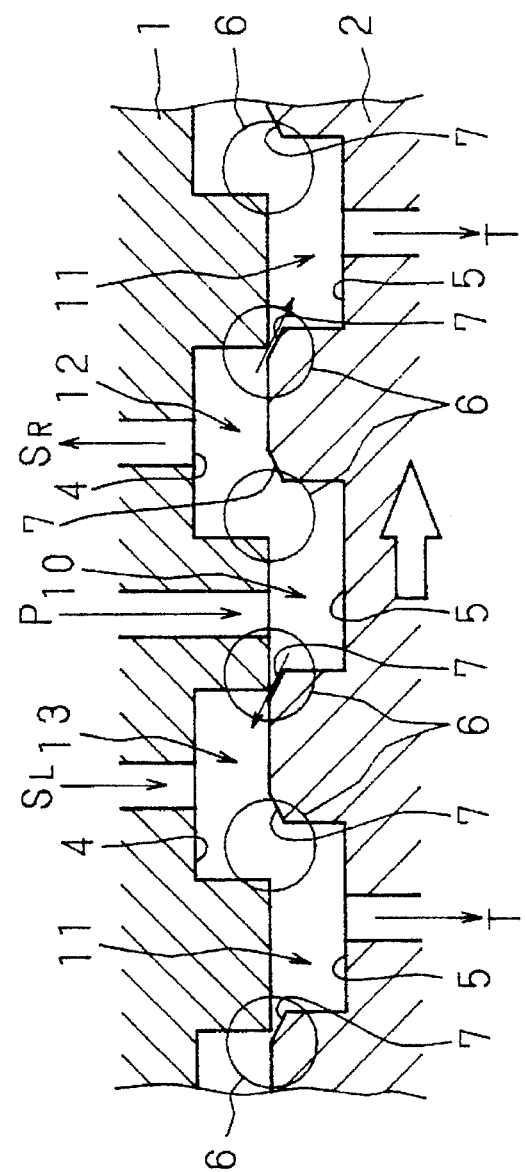
FIG.1A PRIOR ART
FIG.1B PRIOR ART

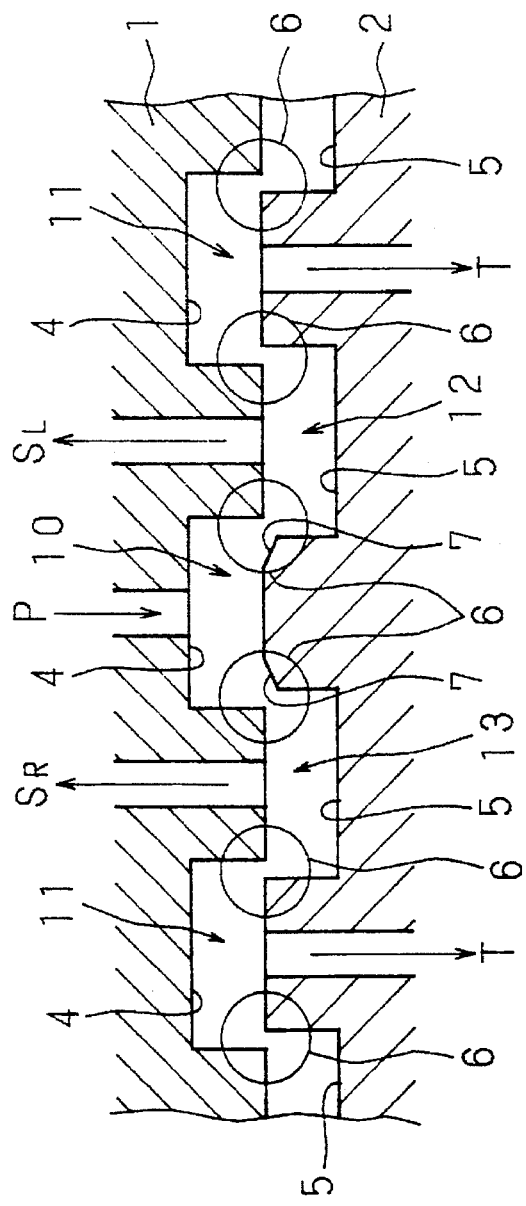
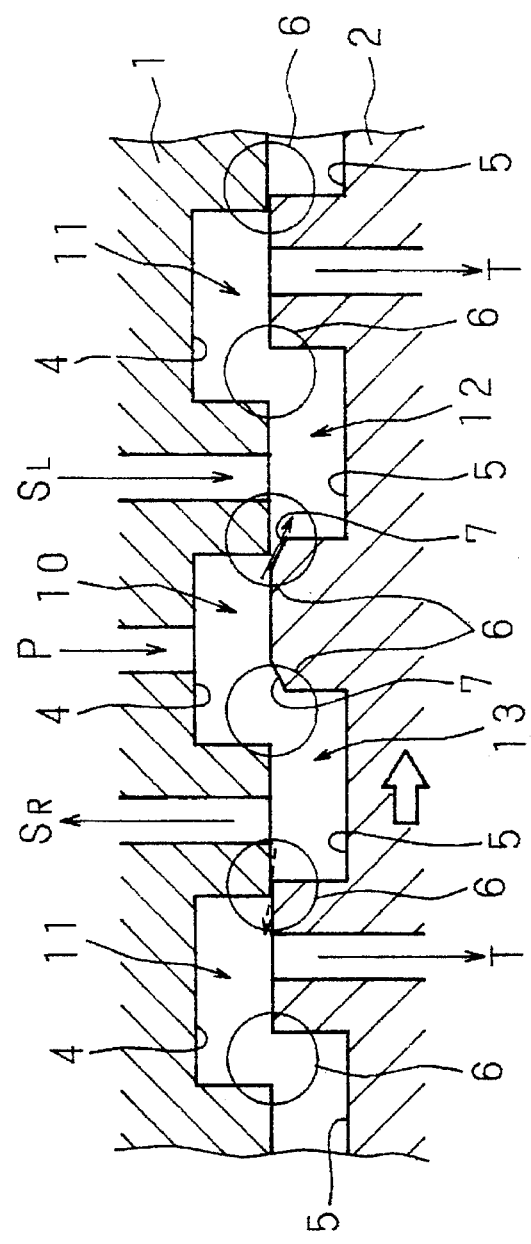
FIG. 4A PRIOR ART
FIG. 4B PRIOR ART

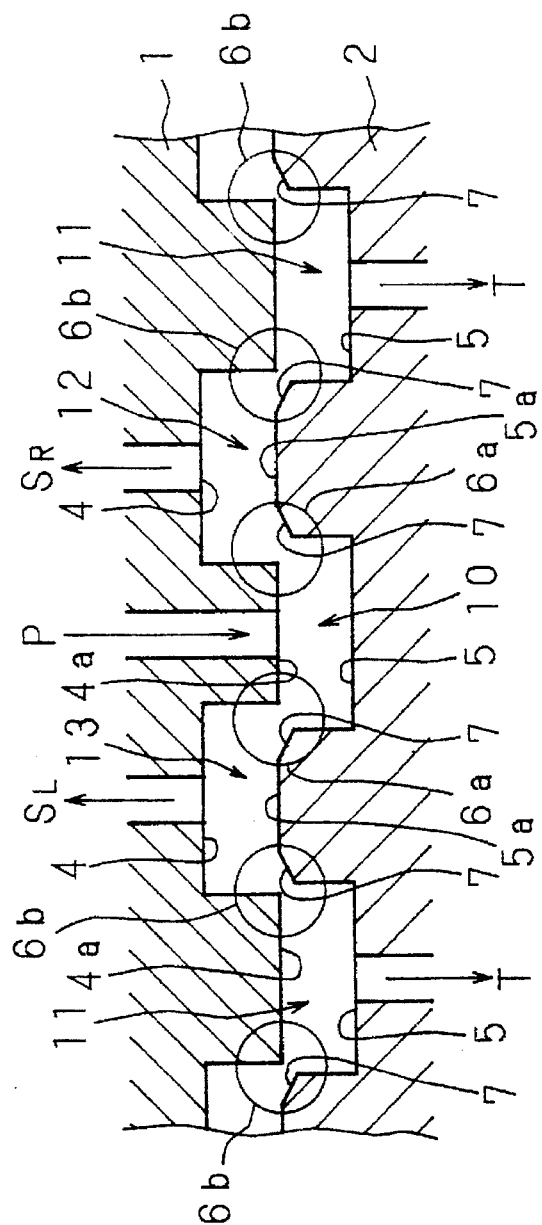
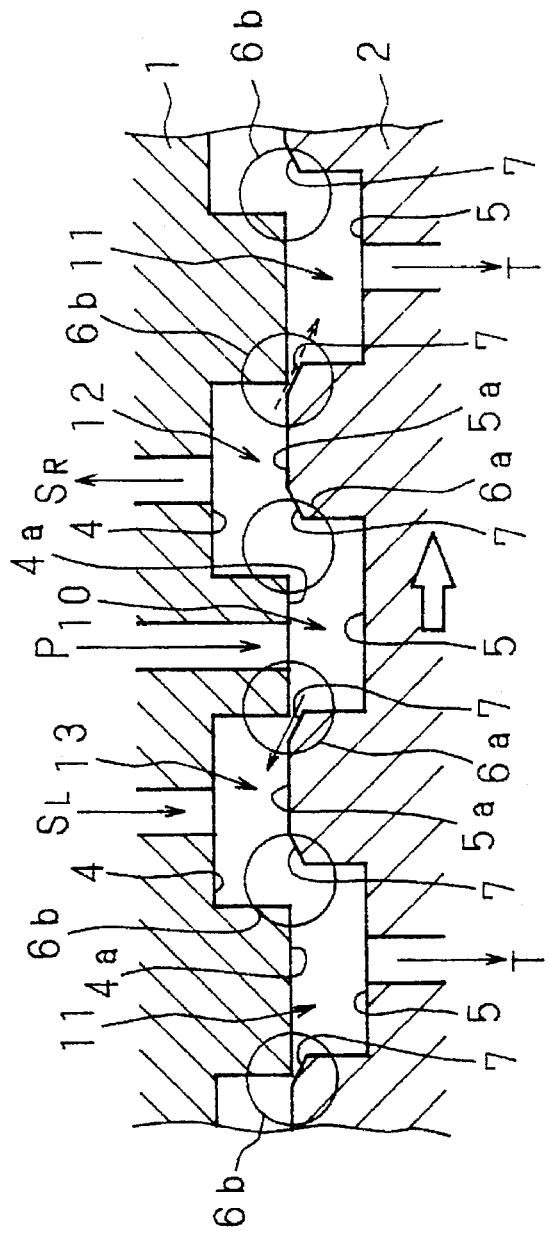
FIG. 8A
FIG. 8B

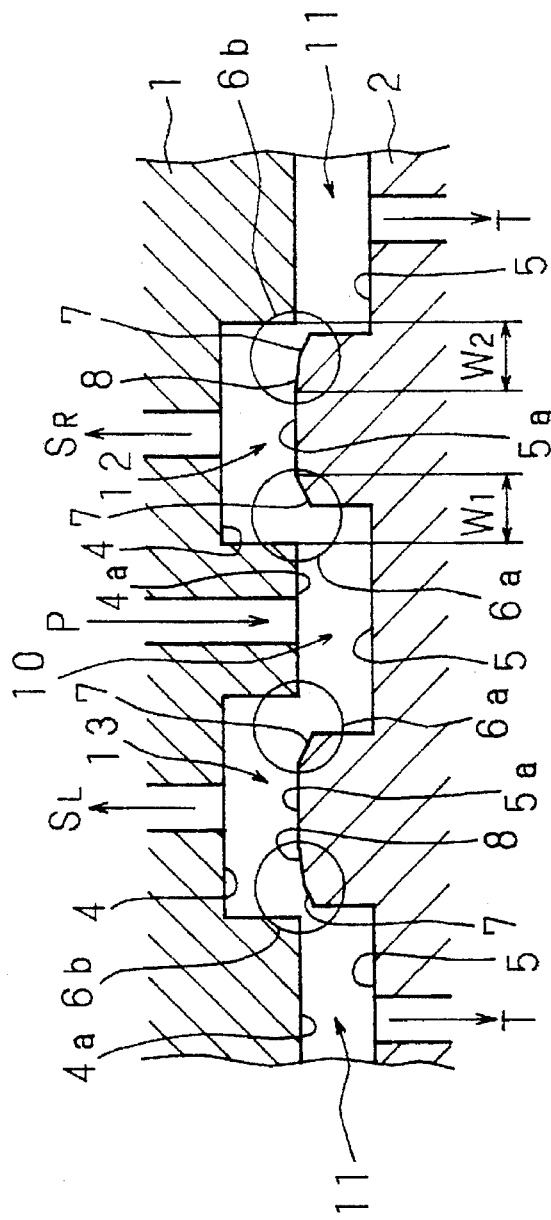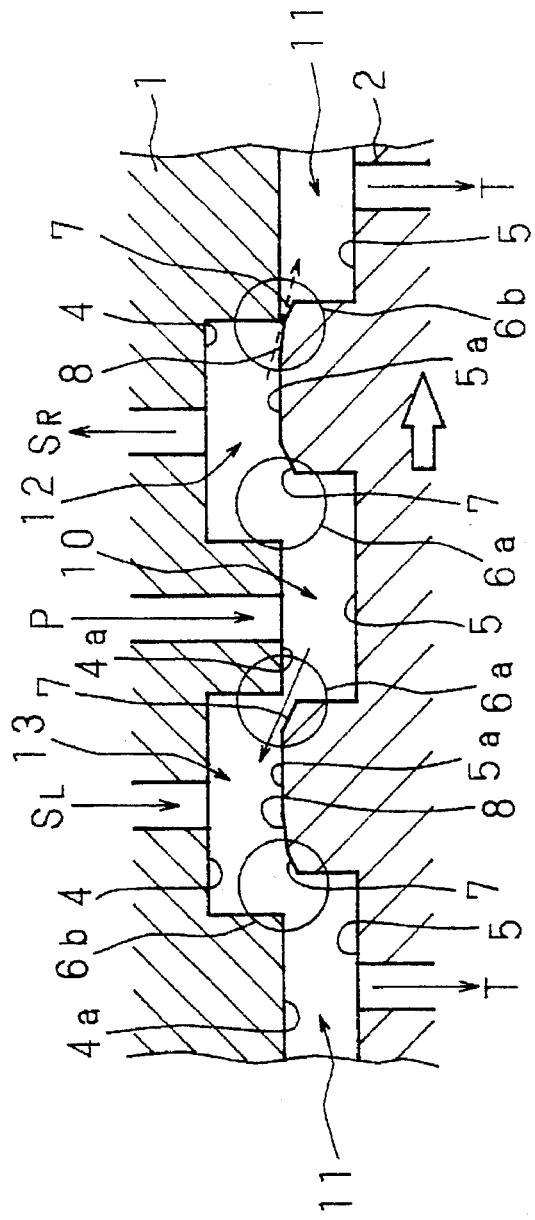
FIG. 9A
FIG. 9B

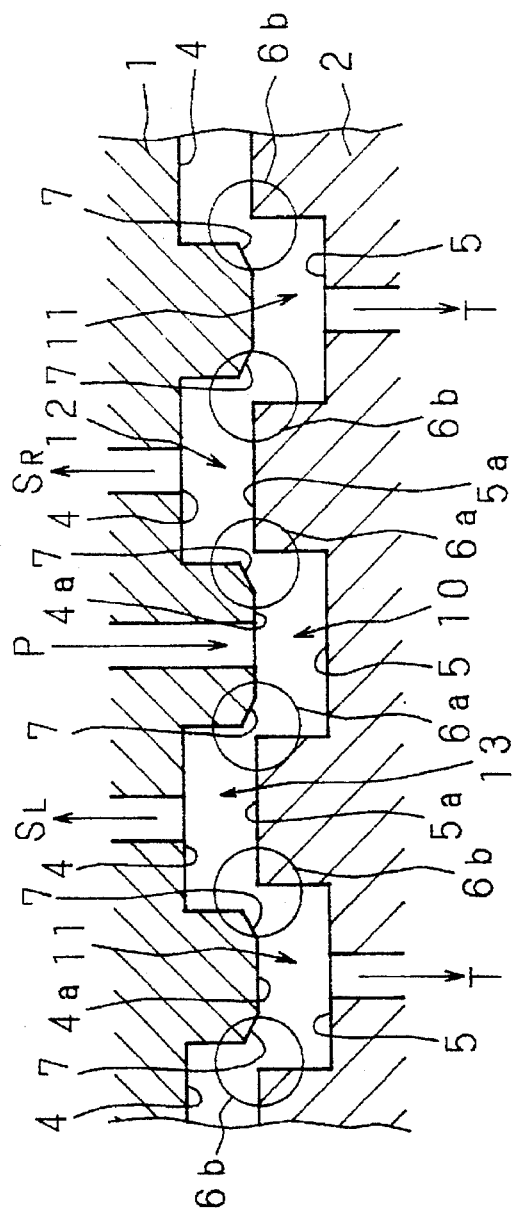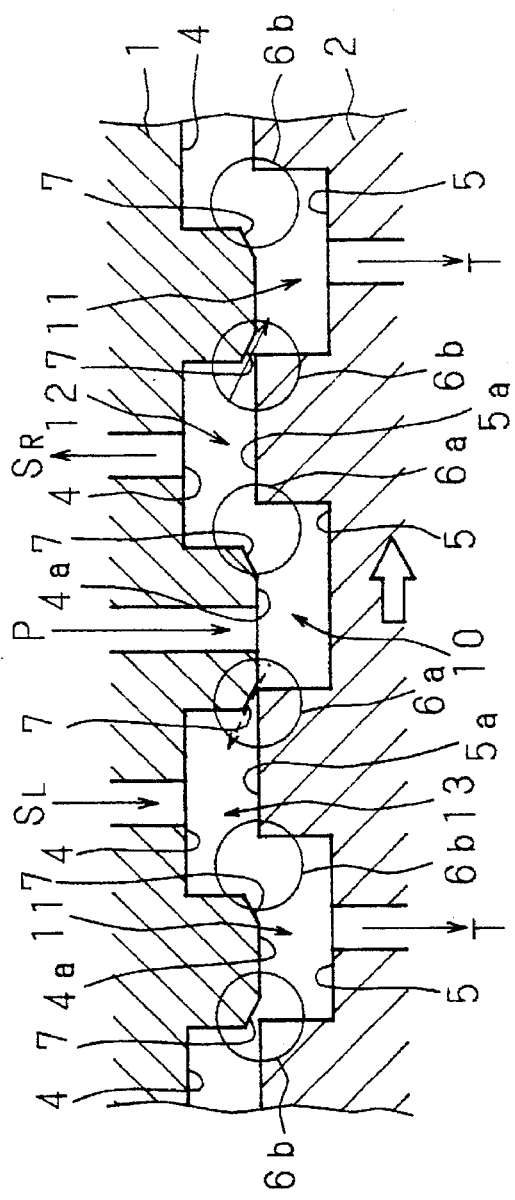
FIG. 13A
FIG. 13B

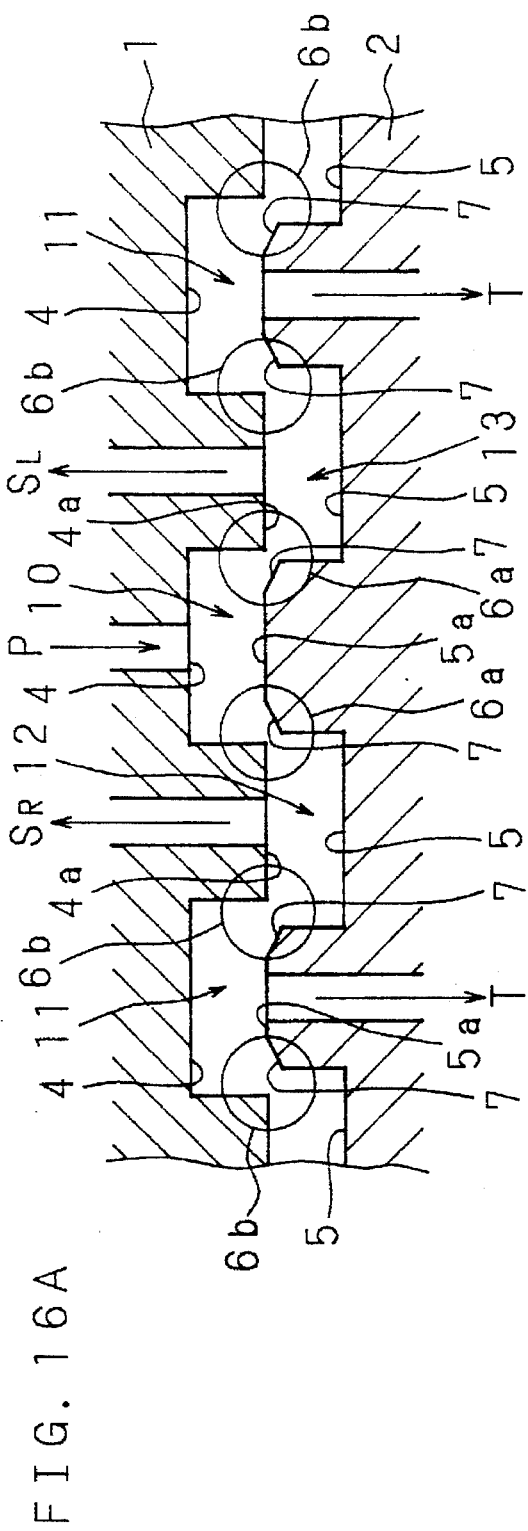
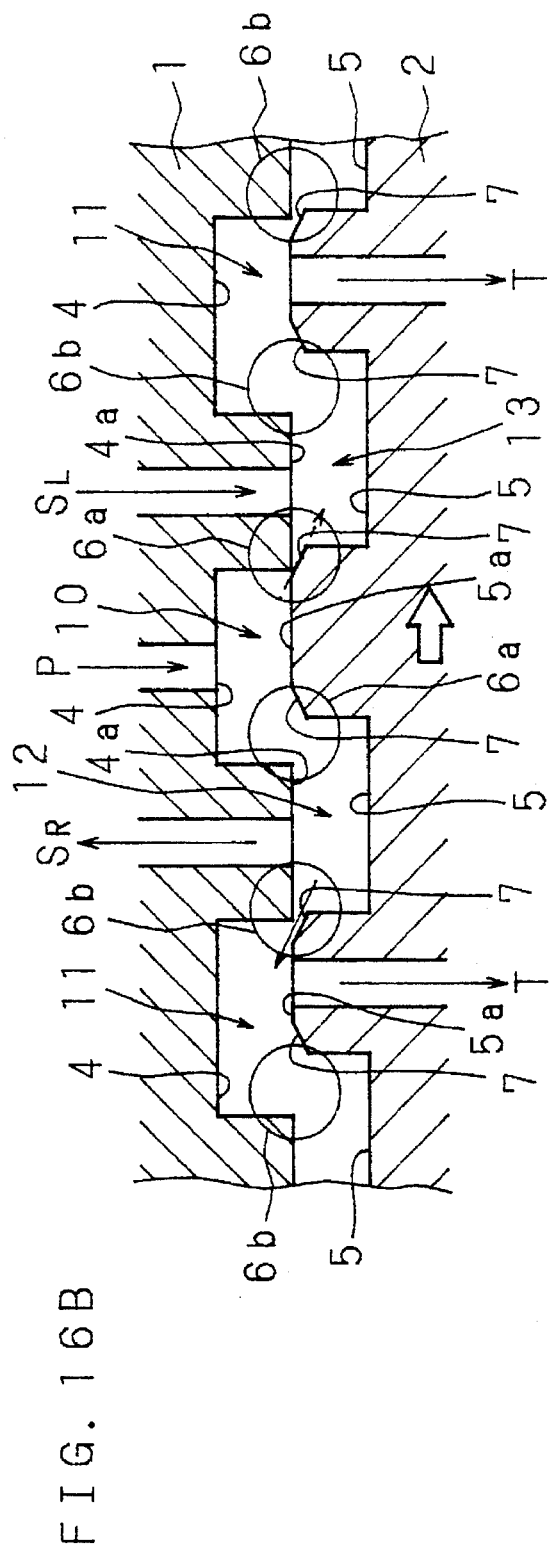
FIG. 16A
FIG. 16B

HYDRAULIC PRESSURE CONTROL VALVE

BACKGROUND OF THE INVENTION

1. Field of the Invention

The present invention relates generally to a rotary hydraulic pressure control valve which controls a hydraulic pressure through a coaxial relative angular displacement between a valve body and a valve spool, and more particularly to a rotary hydraulic pressure control valve which controls a hydraulic pressure delivered to a steer-assisting hydraulic cylinder in accordance with the operation of a steering wheel.

2. Description of Related Art

There is known a hydraulic pressure steering apparatus which assists steering with a hydraulic pressure generated by a double-acting hydraulic cylinder provided in a steering mechanism, thereby saving the labor required in steering and giving a smooth steering feeling. The known hydraulic steering apparatus is provided with a hydraulic pressure control valve provided among a pair of cylinder chambers (to which oil is transferred) housing a hydraulic cylinder, a hydraulic pump (hydraulic pressure source) driven by an engine, and an oil tank (into which the working oil is drained). The hydraulic pressure control valve controls the delivery and drainage of the working oil in accordance with the amplitude and direction of a torque exerted on the steering wheel.

The known hydraulic pressure control valve generally includes a rotary valve designed to utilize the rotation of the steering wheel. This known control valve is provided with an input shaft connected to the steering wheel and an output shaft connected to the steering mechanism, wherein the input shaft and the output shaft are coaxially connected by means of a torsion bar. A cylindrical valve body is joined to one end of the connected input-output shaft, and a valve spool joined to the other end thereof is coaxially fitted in the valve body such that a relative rotation of the valve body or the valve spool is possible. When a torque is exerted on the steering wheel, the torsion bar is twisted to cause a relative angular displacement to occur between the valve body and the valve spool.

The valve body and the valve spool are provided with oil grooves axially cut in the peripheral inside and outside surfaces, respectively, so as to enable a working oil to flow therethrough. The oil grooves of the valve body and valve spool are circumferentially arranged in zigzag positions with lands interposed between circumferentially adjacent oil grooves. The adjacent oil grooves of the valve body and valve spool communicate with each other, and each oil groove and land opposite thereto define an oil supply chamber connected to an oil supply source, an oil drain chamber connected to an oil drain tank, and an oil transfer chamber connected to a cylinder chamber through which oil is transferred to a hydraulic cylinder.

In FIGS. 1A and 1B, which are views exemplifying the operation of a known hydraulic pressure control valve, the valve body 1 and valve spool 2 are shown in an elevation, particularly to show the opposing inside and outside walls of them. As referred to above, the oil grooves 4 of the valve body 1 constitute oil transfer chambers 12 and 13 against the opposing lands along the peripheral surfaces of the valve body 1, each of the oil transfer chambers being connected to cylinder chambers $S_R$ and $S_L$ of a hydraulic cylinder (not shown) through respective bores. The oil grooves 5 of the valve spool 2 are arranged on and along the peripheral outside surface of the valve spool 2 constitute oil supply chambers 10 connected to a hydraulic pressure pump P (oil supply source) through supply bores, oil drain chambers 11 connected to an oil drain tank T through drain bores. The oil supply chambers 10 and oil drain chambers 11 are alternately arranged. It is also possible that the oil grooves 4 of the valve body 1 constitute the oil supply chambers 10 and oil drain chambers 11, and the oil grooves 5 of the valve spool 2 constitute the oil transfer chambers 12 and 13 against the opposing lands.

The oil grooves 4 and 5 communicate with each other through gaps having the same extent of openness on both sides as shown in FIGS. 1A and 1B. These gaps function as throttles whose extent of openness is changeable in accordance with a regular angular displacement occurring between the valve body 1 and the valve spool 2. Hereinafter, these gaps will be referred to as "throttle(s) 6" and the space (extent of openness) of the gap as "throttling extent". Thus, the hydraulic pressure delivered to the cylinder chambers $S_R$ and $S_L$ through the oil transfer chambers 12 and 13 is controlled in accordance with changes in the throttling extent.

FIG. 1A shows a state where no relative angular displacement occurs between the valve body 1 and the valve spool 2. The oil from the pump P is evenly supplied to the oil transfer chambers 12 and 13 because of the equal throttling extent of the throttles 6 on both sides of the oil supply chambers 10, and is delivered to the oil drain chambers 11 through the other throttles 6. In this way, the working oil to be supplied to the oil supply chamber 10 is prevented from flowing into either of the cylinders $S_R$ and $S_L$. No hydraulic power is generated by the hydraulic cylinder.

FIG. 1B shows a state where a torque is exerted on the steering wheel to cause a relative angular displacement to occur between the valve body 1 and the valve spool 2. In this case, one of the throttles 6 (toward the oil transfer chamber 12) on both sides of each oil supply chamber 10 is widened, and the other (toward the oil transfer chamber 13) is restricted. As a result, most of the working oil is flown into the oil transfer chamber 12 through the wider throttle 6, thereby producing pressure difference between the oil transfer chambers 12 and 13, and between the cylinder chambers $S_R$ and $S_L$ connected thereto. The hydraulic cylinder generates hydraulic pressure corresponding to the pressure difference (steer-assisting power).

The pressure difference depends upon the degree of restriction occurring in the other throttles 6 (toward the oil transfer chamber 13), and the degree of restriction depends upon the amplitude of the relative angular displacement between the valve body 1 and the valve spool 2 which depends upon the amplitude of the torque exerted on the steering wheel. As a result, the steer-assisting power generated by the hydraulic cylinder has a direction and amplitude corresponding to the torque exerted on the steering wheel, thereby assisting the operation of the steering wheel. The oil forced out through the other cylinder chamber $S_L$ in accordance with the operation of the hydraulic cylinder is returned to the oil transfer chamber 13, and is introduced into the adjacent oil drain chamber 11 through the widened throttles 6 (toward the oil drain chamber 11). Then the oil is drained into the oil drain tank T which is connected to the oil drain chamber 11.

The corners of the oil grooves 5 of the valve spool 2 facing the respective throttles 6 are circumferentially chamfered to produce chamfered portions 7. More specifically, the corner that the side of each oil groove 5 and the top surface of each land meet is diagonally cut at a given angle so as to be flat in the cut-away width. The chamfered portions 7 are helpful in causing gradual changes in the throttling extent in the throttles 6. A desired increase in the steer-assisting power is not a proportional increase to the torque exerted on the steering wheel but a gradual increase in the range of small torques and a rapid increase beyond a predetermined limit. This desired characteristic is obtained by providing the chamfered portions 7.

The above-mentioned hydraulic pressure control valves are disadvantageous in that when a large relative angular displacement occurs between the valve body 1 and the valve spool 2, the passage of the oil through the restricted throttles 6 involves the occurrence of cavitation, thereby causing harsh noise. The harsh noise is unpleasant and gives strain to the driver.

The widening and restricting of the throttles 6 occur oppositely between both sides of each oil supply chamber 10 and of each oil drain chamber 11. More specifically, each oil supply chamber 10 is adjacent to the throttles 6 toward the oil transfer chambers 12 on one side and the oil transfer chamber 13 on the other side. In the situation shown in FIG. 1B the former throttle 6 is widened and the latter throttle 6 is restricted. On both sides of each oil drain chamber 13 quite the opposite action occurs, that is, the throttle 6 toward the oil transfer chamber 13 is widened, and the throttle 6 toward the oil supply chamber 12 is restricted.

The harsh noise referred to above occurs when the working oil flows through the restricted throttles 6. It has been found out that cavitations accompanied by the oil flow are different with the flows. Taking advantage of this discovery various types of hydraulic pressure control valves have been proposed for reducing harsh noise.

Referring to FIGS. 1A and 1B, one example disclosed in Japanese Utility Model Publication No. 1-43974 (1989) will be described:

It was found out that noise due to cavitations occurs remarkably in the throttles 6 on both sides of the oil drain chambers 11 more often than in those on both sides of the oil supply chamber 10. FIGS. 2A and 2B show an example in which the chamfered portions 7 at the throttles 6 on both sides of the oil supply chamber 10 are formed at a larger angle than those on both sides of the oil drain chamber 11 are. Thus noise is reduced.

In the example of FIGS. 2A and 2B, when a relative angular displacement of the valve spool 2 occurs against the valve body 1, the throttle 6 on one side (toward the oil transfer chamber 13) of the oil supply chamber 10 has a wider throttling extent than the throttle 6 on the same side (toward the oil transfer chamber 12) of the oil drain chamfer 11, and the oil flow, which otherwise would cause harsh noise, is concentrated in the throttle 6, thereby reducing the occurrence of noise.

FIGS. 3A and 3B show another example disclosed in Japanese Patent Publication Laid-Open No. 6-206555 (1994). This example has substantially the same structure as that of Japanese Utility Model Publication No. 1-43974 (1989) but is different in that the chamfers 7 at the corners on the side of the valve body 1 in the throttles 6 on both sides of the oil drain chamber 11 are formed so as to reduce the occurrence of noise.

Other example disclosed in Japanese Patent Application Laid-Open No. 6-156292 (1994). This example has substantially the same structure as that of the above-mentioned two examples but is different in that the chamfers 7 at corners on the side of the valve body 1 in the throttles 6 on both sides of the oil supply chamber 10 are formed, since those throttles 6 are disadvantageous to cavitation.

Utility Model Publication No. 54-28735 (1979), Patent Publication Laid-Open 60-203580 (1985) and U.S. Pat. No. 3,022,772 show a further example, as shown in FIGS. 4A and 4B, in which the chamfered portions 7 are provided in the throttles 6 on both sides of the oil supply chamber 10 so as to reduce the occurrence of noise. This is based on the discovery that noise due to cavitation occurs in the throttles 6 on both sides of the oil drain chambers 11 more often than in those on both sides of the oil supply chambers 10 under the structure in which the oil grooves 4 of the valve body 1 constitute the oil supply chambers 10 and the oil drain chambers 11, and the oil grooves 5 of the valve spool 2 constitute the oil transfer chambers 12 and 13.

According to this example, as shown in FIG. 4B, the throttle 6 on one side (toward the oil transfer chamber 13) of the oil drain chamfers 11 having no chamfered portion is restricted as soon as a relative angular displacement of the valve spool 2 occurs for the valve body 1, whereas the throttles 6 having the chamfered portions 7 on the same sides (toward the oil transfer chamber 12) of the oil supply chambers 10 have wider throttling extent. As a result, the working oil is concentrated in the wider throttle 6 between the oil supply chamber 10 and the oil transfer chamber 12, thereby reducing the occurrence of noise.

The above-mentioned hydraulic pressure control valve seems to have substantially the same function as that of the hydraulic pressure control valve disclosed in Utility Model Publication No. 1-43974 (1989) and shown in FIGS. 2A and 2B. However, looking at the flow state disclosed in Japanese Patent Application Laid-Open Nos. 6-206555 (1995) and 6-156292 (1995) (Refer to FIG. 3A and 3B), the flow state in this hydraulic pressure control valve (Refer to FIGS. 4A and 4B) is same as that disclosed in Japanese Patent Application laid-Open No. 6-156292 (1995) and opposite to those disclosed in Japanese Patent Application Laid-Open No. 6-206555 (1995) and Utility Model Publication No. 1-43974 (1989).

In summary, the known hydraulic pressure control valves aim at eliminating the possibility of noise due to cavitations by recognizing differences in the manner in which cavitation occurs but the contents of the recognition are different from one after another.

Experiments were conducted according to the present invention to define the manner in which cavitation occurs. A oil path mimically structure linearly between the oil supply chamber 10 and the oil drain chamber 11 is constructed so as to be visible from the outside. The manner in which cavitation occurred in case where the throttling extent in the oil supply chamber 10 was restricted, was compared with the manner in which cavitation occurred in case where the throttling extent in the oil drain chamber 11 was restricted, using data measuring noise and observing by eye measurement.

FIGS. 5 and 6 show the results obtained through experiments conducted according to the present invention. FIG. 5 shows that the oil supply chamber 10 and the oil drain chamber 11 are provided on the side of the valve spool 2, as shown in FIGS. 1A, 1B, 2A, 2B, 3A and 3B, and FIG. 6 shows that the oil supply chamber 10 and the oil drain chamber 11 are provided on the side of the valve body 1, as shown in FIGS. 4A and 4b. The results of measuring noise are depicted in FIGS. 5 and 6, with the horizontal-axis representing hydraulic pressures (kgf/cm$^2$) in the up-stream, and with the vertical-axis representing the level (dB) of noise measured. The results of observing cavitations are indicated in terms of comparative assessment based on visual observations.

In Case (a) of FIG. 5 the throttling extent on the side of the oil supply chamber 10 are restricted, and in Case (b) those on the side of the oil drain chamber 11. The comparison indicates that a clear difference appears in the measuring data in a region where hydraulic pressure up-stream of the throttle is below 60 kgf/cm², and especially in Case (a) the level of noise are kept at such a low level as 20 dB or so in a region where hydraulic pressure up-stream of the throttle is below 40 kgf/cm². In Case (b), it will be recognized that in a region where the hydraulic pressure up-stream of the throttle exceeds 20 kgf/cm² noise occurs which has high level (40 dB or so) equal to the high-pressure region.

It was visually observed that in Case (a) no cavitation was observed so long as the throttling extent were small and the hydraulic pressure up-stream of the throttle remained at low pressure, and that in Case (b) cavitation was already observed when the throttles had relatively wide throttling extent. It will be understood from this that in the structure shown in FIG. 5, in which the oil supply chamber 10 and the oil drain chamber 11 are provided in the valve spool 2, the flow in the throttle on the side of the oil supply chamber 10 is less contributive to the occurrence of cavitation.

FIG. 6 shows opposite cases to those of FIG. 5, that is, Case (a) in which the throttles on the oil drain chamber 11 are restricted, and Case (b) in which the throttles on the oil supply chamber 10 are restricted. The comparison of data in Cases (a) and (b) indicates that there is a difference from the cases of FIG. 5 in the region where the hydraulic pressure up-stream of the throttles is below 30 kgf/cm². Case (a) shows that the noise is at low level. It was visually confirmed that the occurrence of cavitation in Case (a) is less frequent than that in Case (b). It will be understood from this that in the structure of FIG. 6, in which the oil supply chamber 10 and the oil drain chamber 11 are provided in the valve body 1, the flow in the throttle on the oil drain chamber 11 is less contributive to the occurrence of cavitation.

In the light of the experimental results mentioned above, the known hydraulic pressure control valves disclosed in Utility Model Publication No. 1-43974 (1989), Patent Publication Laid-Open No. 6-206555 (1944) correspond to the experimental results, and those disclosed in Utility Model Publication No. 54-28735 (1979), Patent Publication Laid-Open No. 60-203580 (1985), Patent Publication Laid-Open No. 6-156292 (1994), and U.S. Pat. No. 3,022,772 are contrary to the experimental results and ineffective for reducing the occurrence of noise.

The chamfered portions 7 are generally provided in the corners of the valve spool 2 but there are some which are provided in the corners of the valve body 1. The occurrence of cavitation in these instances corresponds to the throttles appearing upside down shown in FIGS. 5 and 6. It will be understood from FIGS. 6 and 5, respectively, that in the structure in which the oil supply chamber 10 and the oil drain chamber 11 are provided in the valve body 1, the throttles on the oil drain chamber 11 are less contributive to the occurrence of cavitation, and that in the structure in which the throttles are provided in the oil supply chamber 10 and the oil drain chamber 11, the throttles on the oil supply chamber 10 are less contributive to the occurrence of cavitation. This indicates that when the chamfered portions 7 are provided in the valve body 1, the structures disclosed in Utility Model Publication No. 1-43974 (1989) and Patent Publication Laid-Open No. 6-206555 (1994) are rather contributive to the occurrence of cavitation.

Each of the proposals for reducing noise is only applicable to the respective specific structure including the oil supply source, the oil drain tank and the oil transfer chambers, the oil grooves of the valve body 1 and the valve spool 2, the chamfered portions in the throttles, and the combination thereof but there is no proposal which is applicable to every type of hydraulic pressure control valve.

As shown in FIGS. 4A and 4B the throttles having no chamfered portions is not desirable for obtaining sufficient steer-assisting power. In order to secure an effective amount of steer-assisting power, each of the oil drain chambers 11 is provided with the chamfered portions 7 having a narrower width than that of the chamfered portions 7 on both sides of the oil supply chamber 10 and the throttles 6 on both sides of the oil drain chamber 11 are restricted earlier than those on both sides of the oil supply chamber 10.

However, in the structure mentioned above a difference in the width of the chamfered portion 7 required for actual use is such a small amount as 0.05 mm as to achieve. In addition, two kinds of chamfered portions 7 differing in width are alternately provided, which requires many steps of operations and highly technical skill.

SUMMARY OF THE INVENTION

The present invention is directed to solve the problems discussed above, and an object of the present invention is to provide a hydraulic pressure control valve which prevents the occurrence of cavitation involved in the working oil flowing through the throttles between the valve body and the valve spool irrespective of the structure and without requiring complicated process of fabricating, thereby preventing harsh unpleasant noise from occurring.

According to one aspect of the present invention, the hydraulic pressure control valve includes a cylindrical valve body having first oil grooves and first lands alternately provided on and along the peripheral inside surface; and a cylindrical valve spool coaxially fitted in the valve body so as to allow a relative angular displacement therebetween, the valve spool having second oil grooves arranged in zigzag positions with the first oil grooves, and second lands provided alternately with the second oil grooves on and along the peripheral outside surface; wherein the first oil grooves and the second oil grooves constitute oil supply chambers connected to an oil supply source, oil drain chambers connected to an oil drain end, and oil transfer chambers connected to the oil transfer end through the oil supply chambers and the oil drain chambers on both sides thereof, each of the first and second adjacent oil grooves constituting throttles therebetween, and the throttling extent being changeable in accordance with the relative angular displacement; either of the first lands or the second lands having chamfered portions at the corners, toward the respective throttles; and the throttles through which a working oil flowing from the respective oil supply chambers to the respective oil drain chambers passes along the chamfered portions of the respective lands toward the peripheral top surfaces become wider than throttles through which the working oil passes along the chamfered portions toward the side of the respective lands.

Thus, when a relative angular displacement occurs between the valve body and the valve spool as shown in FIGS. 5 and 6, the working oil can be concentrated in a presumably cavitation-free throttles which are considered to be less contributive to the occurrence of cavitation, the throttles being on the side where an angle between the extension of the chamfered portions in the oil flowing direction and the top surface of the land is smaller.

In a preferred embodiment of the present invention, the chamfered portion facing the restricted throttles has differently slanting surfaces. Thus, in a region where a relatively large relative angular displacement occurs between the valve body and the valve spool, an excessive amount of oil is prevented from being concentrated in the cavitation-free throttle, thereby reducing the occurrence of noise.

In the hydraulic pressure control valve of the present invention including oil grooves in the valve spool which constitute oil supply chambers and oil drain chambers, and oil grooves in the valve body which constitute oil transfer chambers, and the lands of the valve spool having chamfered portions at the corners, the oil grooves of the valve body are circumferentially provided in an offset arrangement such that the throttles on both sides of the oil supply chambers may have wider throttling extent than those of the throttles on both sides of the oil drain chamber.

In an alternative preferred embodiment the adjacent lands of the valve body are arranged with circumferentially different widths.

In another alternative preferred embodiment the lands of the valve spool are circumferentially provided in offset arrangement.

In a further alternative preferred embodiment the adjacent oil grooves of the valve spool are arranged with circumferentially different widths.

According to a further aspect of the present invention, the hydraulic pressure control valve includes oil supply chambers and oil drain chambers constituted by the oil grooves of the valve spool, and oil transfer chambers constituted by the oil grooves of the valve body, wherein the lands of the valve body have chamfered portions at the corners, and wherein the oil grooves of the valve body are circumferentially provided in offset arrangement such that the throttles on both sides of the oil drain chambers may have wider throttling extent than those of the throttles on both sides of the oil supply chamber.

In an alternative preferred embodiment the adjacent lands of the valve body are arranged with circumferentially different widths.

In another alternative preferred embodiment the lands of the valve spool are circumferentially provided in offset arrangement.

In a further alternative preferred embodiment the adjacent oil grooves of the valve spool are arranged with circumferentially different widths.

According to a still further aspect of the present invention, the hydraulic pressure control valve includes oil supply chambers and oil drain chambers constituted by the oil grooves of the valve body, and oil transfer chambers constituted by the oil grooves of the valve spool, wherein the lands of the valve spool have chamfered portions at the corners, and wherein the lands of the valve body are circumferentially provided in an offset arrangement such that the throttles on both sides of the oil drain chambers may have wider throttling extent than those of the throttles on both sides of the oil supply chamber.

In an alternative preferred embodiment the adjacent oil grooves of the valve body are arranged with circumferentially different widths.

In another alternative preferred embodiment the oil grooves of the valve spool are circumferentially positioned in offset arrangement.

In a further alternative preferred embodiment the adjacent lands of the valve spool are arranged with circumferentially different widths.

According to another aspect of the present invention, the hydraulic pressure control valve includes oil supply chambers and oil drain chambers constituted by the oil grooves of the valve body, and oil transfer chambers constituted by the oil grooves of the valve spool, wherein the lands of the valve body have chamfered portions at the corners, and wherein the lands of the valve body are circumferentially provided in offset arrangement such that the throttles on both sides of the oil supply chambers may have wider throttling extent than those of the throttles on both sides of the oil drain chambers.

In an alternative preferred embodiment the adjacent oil grooves of the valve body are arranged with circumferentially different widths.

In another alternative preferred embodiment the oil grooves of the valve spool are circumferentially provided in offset arrangement.

In another alternative preferred embodiment the adjacent lands of the valve spool are arranged with circumferentially different widths.

Thus, according to the present invention, the working oil is concentrated in cavitation-free throttles regardless of the structure of the hydraulic pressure control valve, thereby reducing the occurrence of noise.

The above and further objects and features of the invention will more fully be apparent from the following detailed description with the accompanying drawings.

BRIEF DESCRIPTION OF THE DRAWINGS

FIGS. 1A and 1B are schematic cross-sectional views exemplifying the operation of an ordinary type of prior art hydraulic pressure control valve;

FIGS. 4A and 4B are schematic cross-sectional views exemplifying the operation of a further prior art hydraulic pressure control valve designed to reduce noise due to cavitation;

FIGS. 8A and 8B are schematic cross-sectional views exemplifying the operation of the example shown in FIG. 7;

FIGS. 9A and 9B are schematic cross-sectional views exemplifying the operation of a second example of the present invention;

FIGS. 13A and 13B are schematic cross-sectional views exemplifying the operation of a fourth example of the present invention;

FIGS. 16A and 16B are schematic cross-sectional views exemplifying another aspect of the operation of the fifth example;

DESCRIPTION OF THE PREFERRED EMBODIMENTS

The following describes the preferred embodiments of the present invention with reference to the accompanying drawings:

EXAMPLE 1

Figure 7:
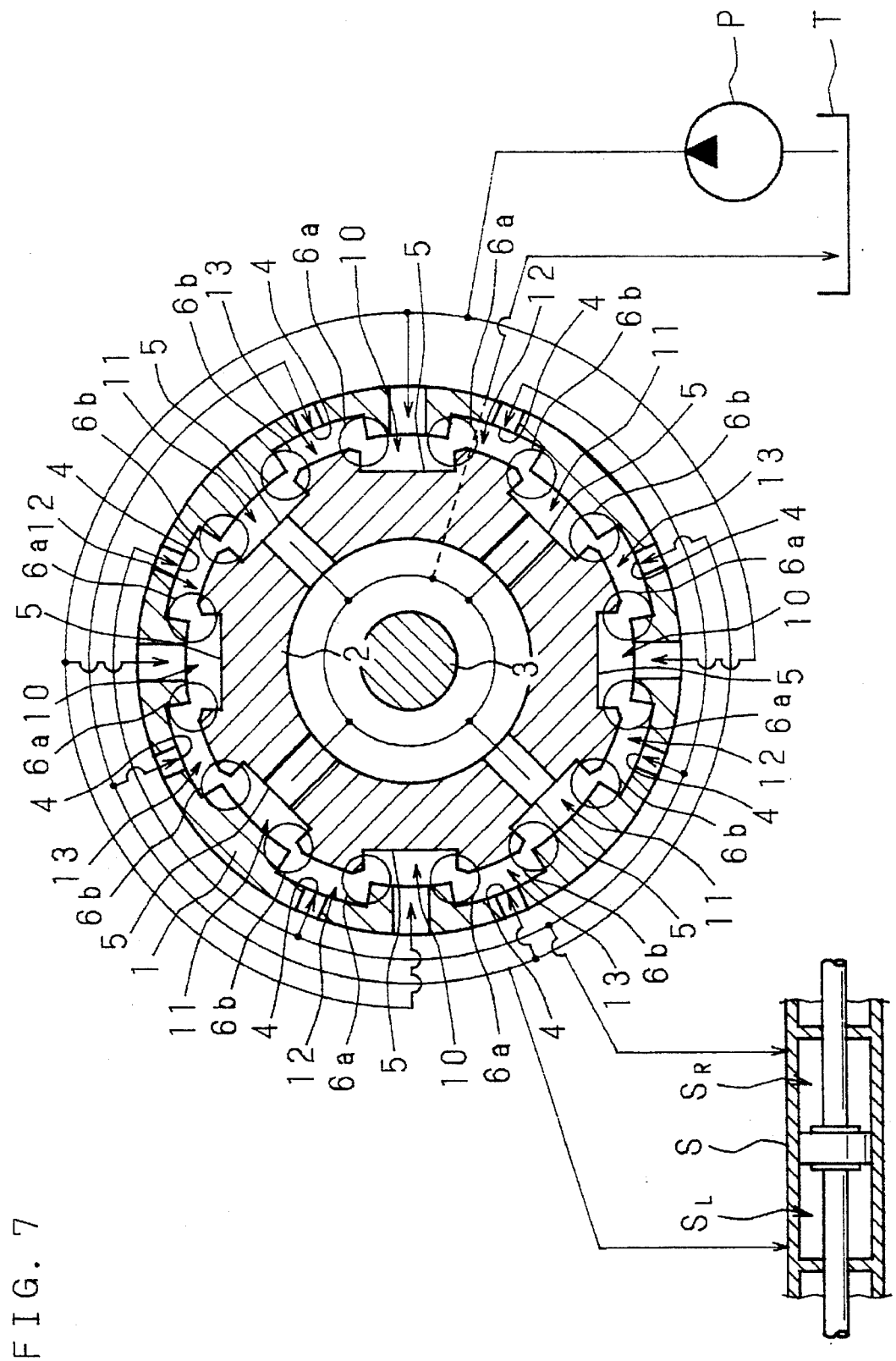
FIG. 7 is a schematic horizontal cross-sectional view showing an example of the hydraulic pressure control valve according to the present invention.

Referring to FIG. 7, which is a horizontal cross-section showing a first example of the hydraulic pressure control valve according to the present invention, the exemplary hydraulic pressure control valve includes a valve body 1 and a valve spool 2. The valve body 1 is cylindrical, and is provided with eight oil grooves 4 (eight oil grooves in the illustrated example) of the same width circumferentially arranged on the inside wall. The valve spool 2 has a thick wall having an outside diameter substantially equal to the inside diameter of the valve body 1. The valve spool 2 is also provided with eight oil grooves 5 (eight oil grooves in the illustrated example) having the same width circumferentially arranged on the outside wall.

In this way the oil grooves 4 and 5 are faced in a zigzag manner as shown in FIG. 7. Each pair of adjacent oil grooves 4 have a land 4a therebetween, and likewise each pair of adjacent oil grooves 5 have a land 5a therebetween. The oil grooves 5 of the valve spool 2 are circumferentially arranged with an equal pitch, whereas the oil grooves 4 of the valve body 1 are circumferentially arranged with the lands 4a having alternately different widths; hereinafter, this arrangement will be referred to as "offset arrangement". As a result, the lands 4a are alternately wide and narrow in width. This offsetting or deviation is as small as a few or tens of minutes in terms of the central angle of the valve body 1.

The grooves 4 of the valve body 1 are formed at one time by passing a broach through the valve body 1, the broach having a size equal to the inside diameter of the valve body 1 and a plurality of cutting blades around the periphery thereof. Since the blades of the broach are not arranged with equal pitch, the formation of the offset arrangement of the oil grooves 4 is easily achieved.

In this way, the hydraulic pressure control valve of Example 1 is constituted with the valve body 1 and the valve pool 2 which is coaxially inserted into the valve body 1 and they are connected to each other by means of a torsion bar 3. When the oil grooves 4 and 5 are in a neutral position where the torsion bar 3 is not subjected to twisting, they are arranged in zigzag positions as shown in FIG. 7 so that the adjacent oil grooves communicate with each other.

The oil grooves 4 of the valve body 1 are opposed to the lands 5a of the valve spool 2, and the oil grooves 5 of the valve spool 2 are opposed to the lands 4a. In this way each opposing pair of oil groove 4 and land 5a constitutes an oil chamber inside the oil groove 4. Likewise, each opposing pair of oil groove 5 and land 4a constitutes an oil chamber outside the oil groove 5. The adjacent oil chambers communicate with each other through paths (hereinafter referred to as "communicating path"). In the illustrated embodiment, eight oil chambers are constituted along the periphery of each of the valve body 1 and the valve spool 2.

A relative angular displacement between the valve body 1 and the valve spool 2 is twistable in a range inherent in the torsion bar 3. The communicating path between each pair of oil chambers functions as a throttle by opening and closing the communicating paths in accordance with the relative angular displacement of the valve body 1 and the valve spool 2. In the hydraulic pressure control valve of Example 1, since the oil grooves 4 of the valve body 1 are arranged in an offset position, the throttles differ in the throttling extent; in the illustrated embodiment, throttles 6a are wider in the throttling extent than the throttles 6b.

As is evident from FIG. 7, each of the alternate four oil chambers in and along the oil grooves 5 has wider throttles 6a on both sides, and is connected to the exhaust of a hydraulic pump P through an oil inlet path passing through the wall of the valve body 1, thereby constituting an oil supply chamber 10 to which the oil pumped by a hydraulic pump P is supplied. Each of the remaining four oil chambers has narrower throttles 6b on both sides is connected to an oil tank T through a bore and a space inside the valve spool 2, thereby constituting an oil drain chamber 11.

Each of the eight oil chambers constituted inside the respective oil grooves 4 has a wider throttle 6a at one end and a narrower throttle 6b at the other end. Each of four oil chambers located circumferentially on the same side adjacent to the oil supply chambers 10 are connected to a cylinder chamber $S_R$ of the hydraulic pressure cylinder S to which oil is supplied through oil conductive bores produced through the valve body 1, thereby constituting oil transfer chambers 12 to the cylinder chamber $S_R$. The other oil chambers are connected to the other cylindrical chamber $S_L$ of the hydraulic pressure cylinder S, thereby constituting an oil transfer chamber 13 to the cylinder chamber $S_L$.

Referring to FIGS. 8A and 8B, the operation of the valve body 1 and the valve spool 2 will be described:

The oil supply chamber 10 communicates with the oil drain chambers 11 through the oil transfer chambers 12 and 13. The oil supply chamber 10 communicates with the oil transfer chambers 12 and 13 through the wider throttles 6a and the oil transfer chambers 12 and 13 communicate with the oil drain chambers 11 through the narrower throttles 6b.

FIG. 8A shows that the valve body 1 and the valve spool 2 are in a neutral position where no relative angular displacement occurs therebetween. In FIG. 8A the wider throttles 6a on both sides of the oil supply chamber 10 are identical in throttling extent. Likewise, the narrower throttles 6b on one side of each of the oil transfer chambers 12 and 13 is identical in throttling extent. The oil transfer chambers 12 and 13 communicate with each other through the oil supply chamber 10 and the wider throttles 6a. Because of the equal throttling extent, the working oil pumped by a hydraulic pump P to the oil supply chamber 10 is evenly distributed into the oil paths on both sides and flowing into the oil drain chamber 11 through the oil transfer chambers 12 and 13. After the oil flows into the space in the valve spool 2 through the oil drainage bores, they merges into a feed-back flow into the oil tank T.

Under the arrangement mentioned above, no pressure difference occurs between the oil transfer chambers 12 and 13, and between the cylinder chambers $S_R$ and $S_L$ of the hydraulic pressure cylinder S, so that no hydraulic power occurs in the hydraulic pressure cylinder S. At this stage, the throttles 6a and 6b keep their throttling extent wide, thereby providing no substantial resistance to the flows of oil between the hydraulic pump P and the tank T. Thus less unnecessary load acts on the hydraulic pump P.

When a torque is exerted on the steering wheel (not shown), a relative angular displacement between the valve body 1 and the valve spool 2 occurs which causes the twisting of the torsion bar 3. Owing to the twisting of the torsion bar 3 the throttling extent of the throttles 6a between the oil supply chamber 10 and the oil transfer chambers 12 and 13 and the throttle 6b between the oil transfer chambers 12 and 13 and the oil drain chamber 11 are changed as shown in FIG. 8B.

Referring to FIG. 8B, the throttles 6a and 6b on both sides of the oil transfer chambers 12 and 13 are changed in throttling extent in opposite manners. For example, when the valve spool 2 is rotated clockwise in FIG. 7 against the valve body 1, the valve spool 2 is moved in the direction of the white thick arrow in FIG. 8B. As a result, in the oil transfer chamber 12 the throttle 6b is more restricted whereas the wider throttle 6a is more widened. In the oil transfer chamber 13 the throttle 6a is more restricted whereas the throttle 6b is more widened.

Most of the working oil introduced in the oil supply chamber 10 is introduced into the oil transfer chamber 12 through the widened throttle 6a, and then into the cylinder chamber $S_R$ communicating with the oil transfer chamber 12. Part of the working oil flown into the oil transfer chamber 12 is introduced into the oil drain chamber 11 through the restricted throttle 6b. Part of the working oil flown into the oil supply chamber 10 is introduced into the oil transfer chamber 13 through the widened throttle 6b at one end of the oil transfer chamber 13.

While the working oil flows in the aforementioned manner, the internal pressure in the oil transfer chamber 12 is substantially equal to that in the oil supply chamber 10, whereas the internal pressure in the oil transfer chamber 13 drops by a reduced pressure because of the restriction of the throttle 6a against the oil supply chamber 10. As a result, pressure differences occur between the oil transfer chambers 12 and 13, and between the cylinder chambers $S_R$ and $S_L$ communicating with these chambers 12 and 13, thereby generating hydraulic pressure as a steer-assisting power.

When the hydraulic pressure cylinder S is operated, it forces out the confined oil out of the cylinder chamber $S_L$. The oil is fed back to the oil transfer chamber 13 connected to the cylinder chamber $S_L$, and flows together with the oil flowing from the oil supply chamber 10. The oil is introduced into the oil drain chamber 11 through the widened throttle 6b at one end of the oil transfer chamber 13, and is drained into the tank T through the space in the valve spool 2.

As is evident from the foregoing description, the steer-assisting power obtained by the hydraulic pressure cylinder S depends upon the degree of restriction in the throttle 6a between the oil supply chamber 10 and the oil transfer chamber 13, and the throttle 6b between the oil drain chamber 11 and the oil transfer chamber 12. The throttling extent is restricted by the relative angular displacement between the valve body 1 and the valve spool 2. The relative angular displacement depends upon a torque exerted on the steering wheel so as to twist the torsion bar 3 connecting the valve body 1 to the valve spool 2.

When the relative angular displacement between the valve body 1 and the valve spool 2 occurs counterclockwise as shown in FIG. 7, the previously widened throttles are restricted, and the previously restricted throttles are widened, thereby enabling the hydraulic pressure cylinder S to generate a steer-assisting power from the cylinder chamber $S_L$ to the hydraulic pressure cylinder $S_R$. Likewise, the amplitude of this steer-assisting power depends upon the torque exerted upon the steering wheel. In this way, the steer-assisting power is obtained in accordance with the direction and the amplitude of the torque exerted upon the steering wheel.

Each oil groove 5 of the valve spool 2 is chamfered at the corners (hereinafter referred to as "chamfered portions 7") having a predetermined width circumferentially. The chamfered portions 7 are intended to increase the strength of a steer-assisting power by smoothly widening and restricting the throttling extent of the throttles 6a and 6b. Thus, the steer-assisting power gradually increases in strength when a torque exerted on the steering wheel is relatively small and intensify it when the torque exceeds a predetermined value.

In FIG. 8B, part of the working oil introduced into the oil supply chamber 10 is caused to flow into the oil transfer chamber 13 through the restricted throttle 6a, and the other part of it is caused to flow into the oil drain chamber 11 through the oil transfer chamber 12 and the restricted throttle 6b. The flows of the working oil cause cavitation accompanied by harsh noise.

The hydraulic pressure control valve of Example 1 has the same structure as that shown in FIGS. 1A and 1B, with the oil grooves 4 in the valve body 1 constituting the oil transfer chambers 12 and 13, and the oil grooves 5 in the valve spool 2 constituting the oil supply chamber 10 and the oil drain chamber 11.

Figure 6:
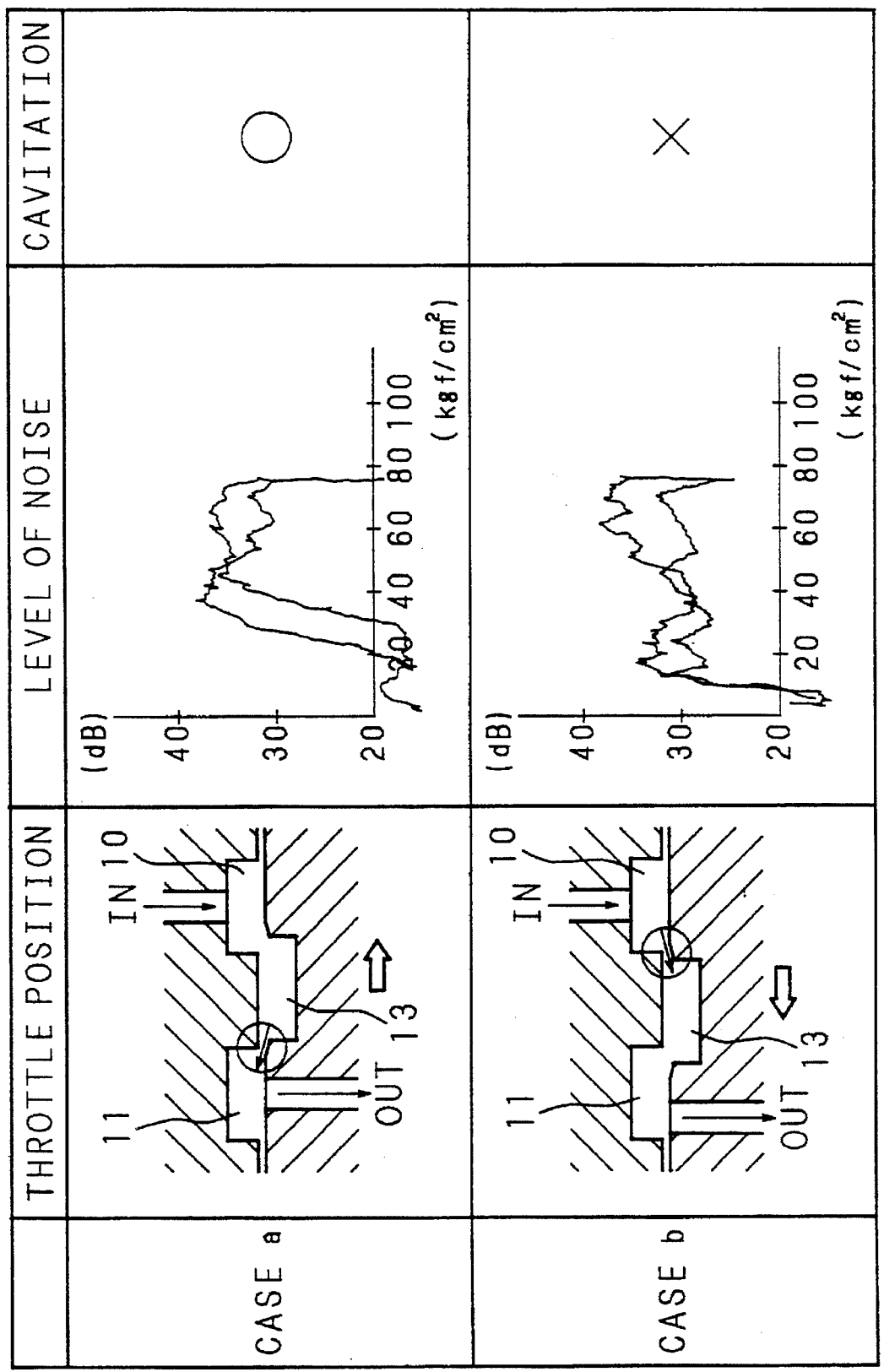
FIG. 6 is a chart showing the results of another experiments conducted to examine the relationship among the condition of a throttle, noise and cavitation.

As will be understood from the results of experiments shown in FIG. 6, in order to reduce the occurrence of cavitation causing noise, there are some proposals such as proposed by Japanese Utility Model Publication No. 54-28735 (1979), Patent Application Laid-Open Publication No. 60-203580 (1985), Patent Application Laid-Open Publication No. 6-156292 (1994), and U.S. Pat. No. 3,022,772. The proposed solution to the noise in common with these prior arts is that the oil flow likely to cause cavitation is concentrated on the throttle 6 on each side of the oil supply chamber 10 by enlarging the throttling extent thereof more than those in the throttles 6 on each side of the oil drain chamber 11. The solution proposed by these prior arts is easily achieved by Example 1 because of the above-mentioned structure.

In the hydraulic pressure valve of Example 1, owing to the offset arrangement of the oil grooves 4 of the valve body 1, the throttle 6a on each side of the oil supply chamber 10 connected to the oil hydraulic pump P (oil source) has a larger throttling extent than the throttle 6b on each side of the oil drain chamber 11 has. This differences in the size of the throttling extent are maintained under the operations shown in FIG. 8B.

More specifically, the throttle 6a between the oil supply chamber 10 and the oil transfer chamber 13 has a larger throttling extent than the throttle 6b between the oil transfer chamber 12 and the oil drain chamber 11 has, so that the flow of the working oil from the oil supply chamber 10 to the oil drain chamber 11 is advantageously concentrated in the throttle 6a between the oil supply chamber 10 and the oil transfer chamber 13, and a smaller amount of the working oil flows into the oil drain chamber 11 through the other throttle 6b, thereby reducing the occurrence of cavitation. If any occurs while passing the throttle 6b, the production of harsh noise is minimized since the amount of the working oil is small.

EXAMPLE 2

Referring to FIGS. 9A and 9B, Example 2 will be described:

The hydraulic pressure control valve of Example 2 has the same structure as that show in FIGS. 7, 8A and 8B, with the oil grooves 4 in the valve body 1 constituting the oil transfer chamber 12 and 13, and the oil grooves 5 in the valve spool 2 constituting the oil supply chamber 10 and oil drain chamber 11 and the oil grooves 4 in the valve body 1 are circumferentially provided in offset arrangement.

The hydraulic pressure control valve of Example 2 is different from Example 1 in that in addition to chamfered portion 7 a second chamfered portion 8 is provided on another side of the corner of each oil groove 5 facing the respective throttle 6b.

The second chamfered portions 8 are intended to enable the position at which the throttles 6b on both sides of the oil drain chamber 11 are fully restricted to coincide with that at which the throttles 6a on both sides of the oil supply chamber 10.

The second chamfered portion 8 is produced such that it has a smaller inclination than that of the first chambered portion 7 and that $W_2$ is equal to $W_1$ where $W_2$ is the width from the extension of the right-hand defining side of the oil groove 4 up to the position at which the second chamfered portion 8 terminates, and $W_1$ is the width from the extension of the left-hand defining side of the same oil groove 4 up to the position at which another chamfered portion 7 terminates. The second chamfered portion 8 allows even a slight throttling extent as shown in FIG. 9B to remain in the throttles 6b until the throttle 6b is completely closed.

The throttles 6a on both sides of the oil supply chamber 10 are advantageous against the occurrence of cavitation. However, where a relatively large relative angular displacement occurs between the valve body 1 and the valve spool 2, the throttle 6b is restricted earlier than the throttle 6a, thereby causing a whole amount of oil to concentrate in the throttle 6a. Then no preventive method is available for stopping the occurrence of cavitation. Noise is unavoidable. As described above, the second chamfered portions 8, as shown in FIGS. 9A and 9B, are advantageous in that until the throttle 6a is fully restricted, the throttle 6b holds the flow of the working oil and lessens the concentration of the oil flow in the throttle 6a. As a result, the noise can be reduced in such regions as referred to above where a relatively large relative angular displacement occurs.

Figure 10:
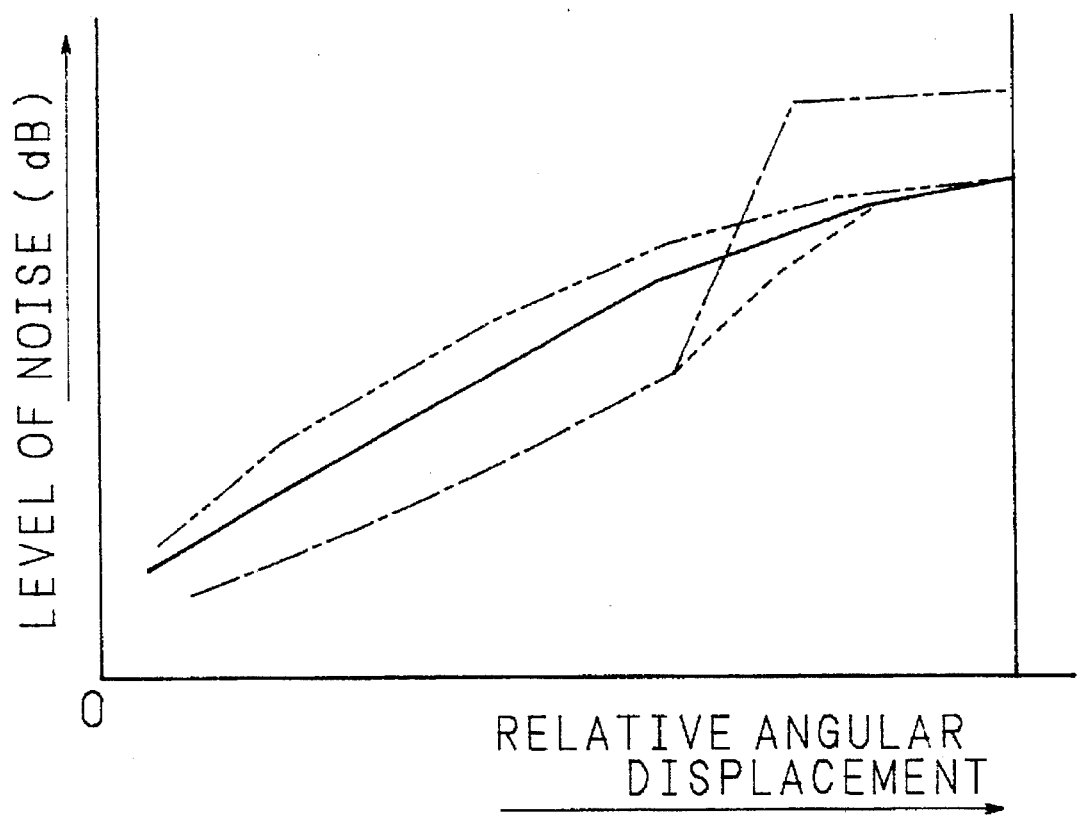
FIG. 10 is a graph showing comparative data obtained by measuring the noise occurring in the prior art and the present invention.

FIG. 10 is a graph showing changes in the levels of noise involved in the relative angular displacement between the valve body 1 and the valve spool 2. The vertical axis indicates the levels of noise and the horizontal-axis indicates the amounts of the relative angular displacement. The two-dots line indicates the results of measuring the noise occurring under the known hydraulic pressure control valve which is provided with oil grooves 4 of the valve body 1 at an equal pitch. The full line and the one-dot line indicate the results of measuring the noise occurring under the hydraulic pressure control valve of Example 1, wherein the full line indicates a case where the offset arrangement is small, and the one-dot line indicates a case where the offset arrangement is large.

The graph shows that when the offset arrangement of grooves 4 is small, the noise is reduced over the whole range of the relative angular displacement, whereas when it is large, the noise lessens in a region where the relative angular displacement is small, and the level of noise rises in a region where the angular displacement is large, sometimes to such an extent that it exceeds that of the known hydraulic pressure control valve.

The second chamfered portions 8 shown in FIGS. 9A and 9B are advantageous in reducing the noise occurring in the region where the relative angular displacement is large. The second chamfered portions 8 reduces the concentration of the working oil in the throttles 6a on both sides of the oil supply chamber 10. As a result, as indicated by the dotted line in FIG. 10, the level of noise gradually changes in the region where the relative angular displacement is large. When the offset amount of the oil grooves 4 is enlarged with a large reduction in the noise in the region where the relative angular displacement is small and as a whole the noise is tremendously reduced.

EXAMPLE 3

Figure 11:
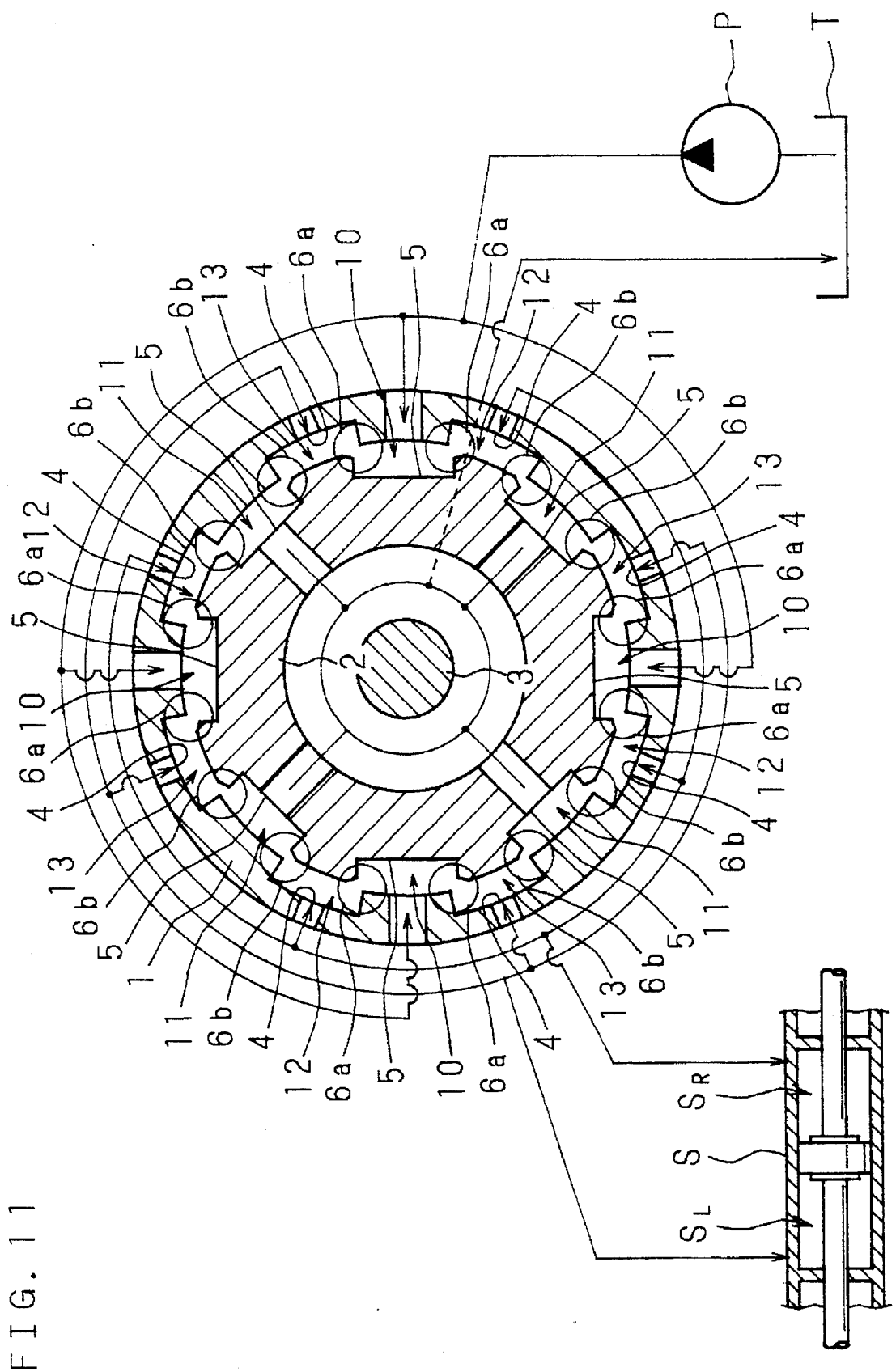
FIG. 11 is a schematic horizontal cross-sectional view showing a third example of the present invention.

Referring to FIG. 11, a third example of the embodiment will be described:

This embodiment also includes a valve body 1 and a valve spool 2. The valve body 1 is provided with eight oil grooves 4 circumferentially on the inside wall at an equal pitch. The valve spool 2 has an outside diameter substantially equal to the inside diameter of the valve body 1, and is circumferentially provided with eight oil grooves 5 circumferentially on the outside wall at equal intervals.

The eight oil grooves 4 of the valve body 1 have an equal width, but the eight oil grooves 5 of the valve spool 2 have alternately wide and narrow widths because of the offset arrangement of the lands 5a. The amount of the offset arrangement of the lands in the valve spool 2 is as small as a few or tens of minutes in terms of the central angle of the valve spool 2.

The valve body 1 and the valve spool 2 are coaxially connected to each other by means of a torsion bar 3 passed through the valve spool 2. When the valve body 1 and the valve spool 2 are in a neutral position with the torsion bar 3 being not twisted, the oil grooves 4 and 5 are in the zigzag positions shown in FIG. 11 such that the adjacent oil grooves communicate with each other.

In this way, the oil grooves 4 of the valve body 1 are opposed to the lands 5a of the valve spool 2, and the oil grooves 5 of the valve spool 2 are opposed to the lands 4a of the valve body 1. Thus, the eight oil grooves 4 and lands 5a define eight oil chambers therebetween along the inside wall of the valve body 1. Likewise, the eight oil grooves 5 and lands 4a define eight oil chambers therebetween along the outside wall of the valve spool 2. The adjacent oil chambers communicate with each other through communicating paths.

The valve body 1 and the valve spool 2 are angularly displaceable in a twistable range of the torsion bar 3. The communicating paths function as throttles which increase and decrease the communicable extent (throttling extent of openness) in accordance with the relative angular displacement. Because of the fact that the four wider oil grooves 5 and the four narrower oil grooves 5 are alternately arranged with the lands 5a being in the offset arrangement, the throttling extent are not equal, and the eight throttles 6a on both sides of each of the four oil chambers defined by the wider oil grooves 5 have a larger throttling extent than the eight throttles 6b on both sides of each of the four oil chambers defined by the narrow oil grooves 5.

Each of the four oil chambers, alternately arranged, has the throttles 6a on both sides, and is connected to an exhaust of a hydraulic pump P (oil pressure source) through a conductive bore passed through the wall of the valve body 1. In this way oil supply chambers 10 are constituted into which a working oil is introduced from the pump P. Each of the other oil chambers has restricted throttles 6b on both sides is connected to an oil tank T into which the working oil is drained through a drainage bore radially passed through the valve spool a space in the valve spool 2. In this way oil drain chambers 11 are constituted as a drainage to the tank T.

Each of the eight oil chambers constituted inside the oil grooves 4 of the valve body 1 has a widened throttle 6a on one side and a restricted throttle 6b on the other side. Each of the four adjacent oil chambers, alternately and circumferentially arranged on the same side of the oil supply chamber 10, is connected to a cylinder chamber $S_R$ through a conductive bore passed through the wall of the valve body 1, thereby constituting an oil transfer chamber 12 to the cylinder chamber $S_R$. Each of the other four oil chambers constitutes an oil transfer chamber 13 connected to a cylinder chamber $S_L$.

Figure 12A:
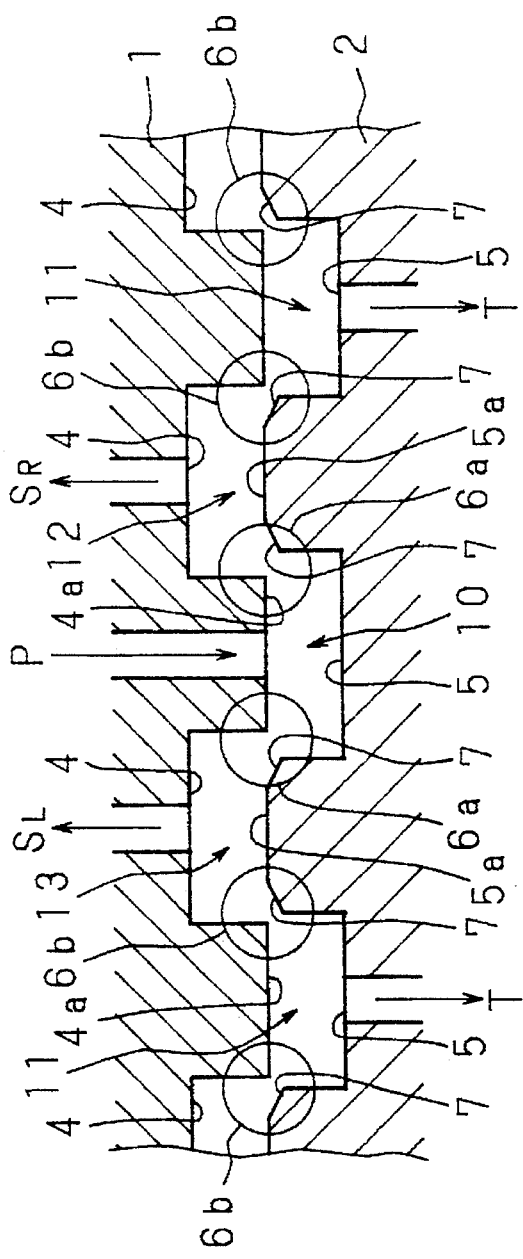
FIGS. 12A and 12B are schematic cross-sectional views exemplifying the operation of the third example shown in FIG. 11.
Figure 12B:
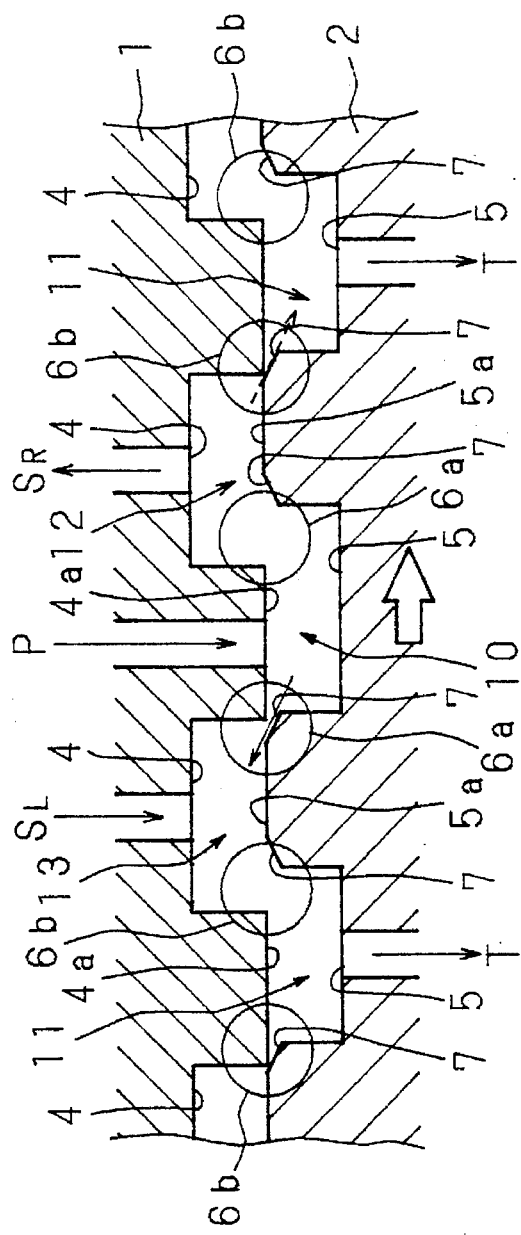

Referring to FIGS. 12A and 12B, oil paths are produced on both sides of the oil supply chamber 10, the paths being connected to the oil drain chambers 11 through the oil transfer chambers 12 and 13, respectively. In this way the oil supply chamber 10 are connected to the oil transfer chambers 12 and 13 through the widened throttles 6a, and the oil transfer chambers 12 and 13 are connected to the oil drain chambers 11 through the restricted throttles 6b.

FIG. 12A shows that the valve body 1 and the valve spool 2 are in a neutral position where no relative angular displacement occurs. At this stage, the throttles 6a on both sides of the oil supply chamber 10 have the same throttling extent. Likewise, the other throttles 6b have the same throttling extent. As a result, the working oil supplied by the pump P to the oil supply chamber 10 is evenly distributed to both communicating paths, and reaches the oil drain chamber 11 through the oil transfer chambers 12 and 13. The working oil flows into the space in the valve spool 2 through the drainage bore, and merges into a feedback flow into the oil tank T.

In this case, no pressure difference occurs between the oil transfer chambers 12 and 13, and between the cylinder chambers $S_R$ and $S_L$ of the hydraulic cylinder S occurs, thereby resulting that the hydraulic cylinder S generates no power. In this situation, the throttles 6a and 6b positioned midway in the oil paths maintain the wide throttling extent, thereby providing no substantial resistance to the oil flow between the pump P and the tank T, thereby reducing a load upon the pump P.

The exertion of a torque upon the steering wheel (not shown) causes a relative angular displacement between the valve body 1 and the valve spool 2 involving a twisting of the torsion bar 3, thereby changing the throttling extent of the throttles 6a between the oil supply chamber 10 and the oil transfer chambers 12, and between the oil supply chamber 10 and the oil transfer chamber 13, and those of the throttles 6b between the oil drain chamber 11 and the oil transfer chamber 12, and between the oil drain chamber 11 and the oil transfer chamber 13.

The changes in the throttling extent occur in opposite directions; for example, when the relative rotation of the valve spool 2 in a clockwise direction with respect to the valve body 1 in FIG. 11, the valve spool 2 is moved in the direction indicated by the white thick arrow in FIG. 12B. On both sides of the oil transfer chamber 12 the throttle 6a toward the oil supply chamber 10 has a widened throttling extent, and the throttle 6b toward the oil drain chamber 11 has a restricted throttling extent. On both sides of the oil transfer chamber 13 the throttle 6a toward the oil supply chamber 10 has a restricted throttling extent, and the throttle 6b toward the oil drain chamber 11 has a widened throttling extent.

In this way, most of the working oil supplied into the oil supply chamber 10 is introduced into the oil transfer chamber 12 through the widened throttle 6a, and is then supplied into the cylinder chamber $S_R$ communicating with the oil transfer chamber 12. Part of the oil introduced into the oil transfer chamber 12 is flown into the oil drain chamber 11 through the restricted throttle 6b. Part of the oil introduced into the oil supply chamber 10 is flown into the oil transfer chamber 13 through the restricted throttle 6a, and is introduced into the oil drain chamber 11 through the widened throttle 6b on the other side of the oil transfer chamber 13.

Under the operations mentioned above the internal pressure in the oil transfer chamber 12 is maintained substantially equal to that in the oil supply chamber 10, whereas the internal pressure in the oil transfer chamber 13 is lower by a reduced pressure caused by the passage of oil through the restricted throttle 6a between the oil transfer chamber 13 and the oil supply chamber 10. As a result, pressure differences occur between the oil transfer chambers 12 and 13, and between the cylinder chambers $S_R$ and $S_L$, thereby enabling the hydraulic cylinder S to generate a hydraulic pressure (steer-assisting power) through the cylinder chamber $S_R$ to the cylinder chamber $S_L$. In this way the oil confined in the cylinder chamber $S_L$ is pushed out and introduced into the oil transfer chamber 13 where it combines with the oil from the oil supply chamber 10. The combined flow is introduced into the oil drain chamber 11 through the widened throttle 6b on the other side of the oil transfer chamber 13, and drained into the tank T through the space in the valve spool 2.

The strength of the steer-assisting power generated by the hydraulic cylinder S depends upon the degree of restriction in the throttle 6a between the oil supply chamber 10 and the oil transfer chamber 13, and the throttle 6b between the oil drain chamber 11 and the oil transfer chamber 12. The restriction in the throttling extent is caused by the relative angular displacement occurring between the valve body 1 and the valve spool 2, and the relative angular displacement depends upon the amplitude of the torque exerted on the steering wheel so as to cause the twisting of the torsion bar 3 which connects the valve body 1 and the valve spool 2.

If the relative rotation between the valve body 1 and the valve spool 2 occurs in a counter-clockwise direction in FIG. 11, the changes in the throttles 6a on both sides of the oil supply chamber 10 and the throttles 6b on both sides of the oil drain chamber 11 oppositely occur, thereby enabling the hydraulic cylinder S to generate a steer-assisting power from the cylinder chambers $S_L$ to $S_R$. This steer-assisting power also depends upon the amplitude of the torque exerted on the steering wheel. In this way a steer-assisting power of an adequate strength is obtained, according to the amplitude and direction of a torque exerted on the steering wheel.

The corners of the valve spool 2 facing the throttle 6a or 6b have chamfered portion 7; more specifically, the chamfered portion 7 is formed by cutting at a predetermined angle the corner defined by the side wall of the oil groove 5 and the peripheral surface of the land between the adjacent oil grooves 5. Each of the chamfered portions has circumferentially a given width, and is intended to ensure that the throttling extent in each throttle 6a and 6b is gradually changed for a relative angular displacement. As a result, the steering apparatus can have desirable increasing characteristics of the steer-assisting power; that is, the steer-assisting power gradually increases so long as the torque exerted on the steering wheel is small, and intensifies when the steering torque exceeds a predetermined value.

Under the operations shown in FIG. 12B part of the working oil introduced into the oil supply chamber 10 is partly flown into the oil transfer chamber 13 through the restricted throttle 6a, and partly flown into the oil drain chamber 11 through the restricted throttle 6b on the other side of the oil transfer chamber 12. These flows cause cavitation accompanied by harsh noise.

Figure 2A:
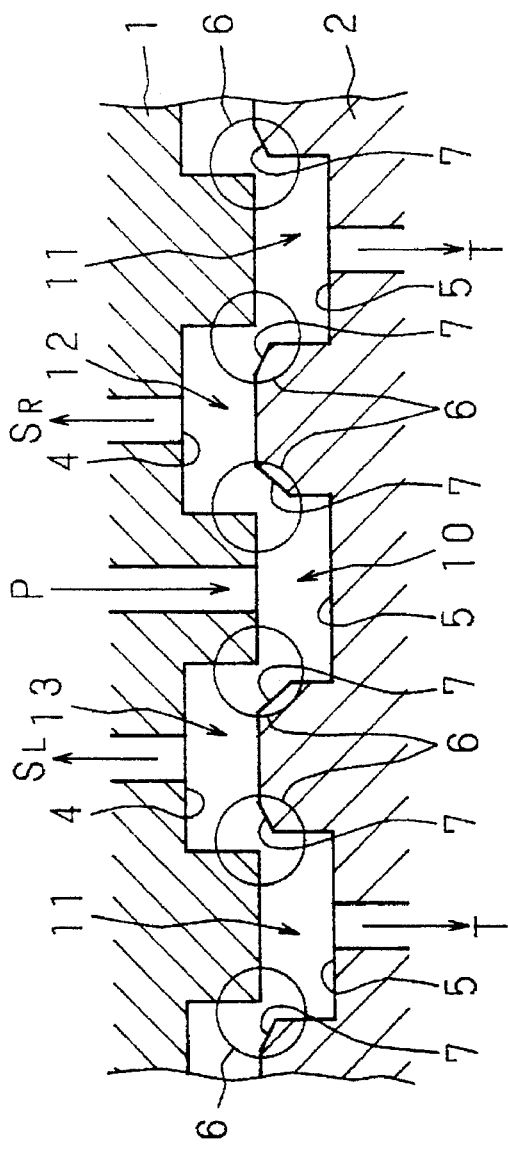
FIGS. 2A and 2B are schematic cross-sectional views exemplifying the operation of a prior art hydraulic pressure control valve designed to reduce noise due to cavitation.
Figure 2B:
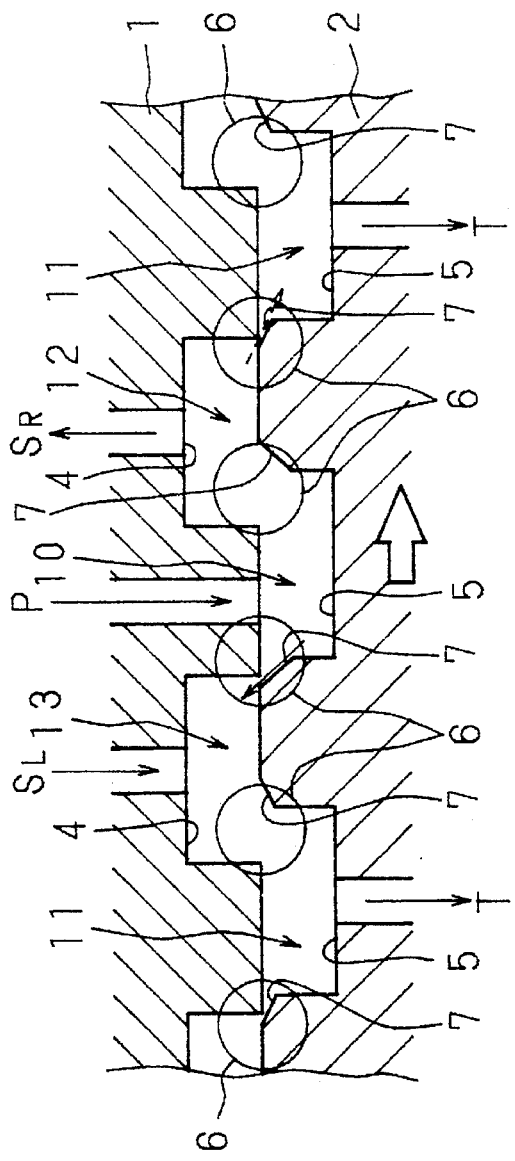
Figure 3A:
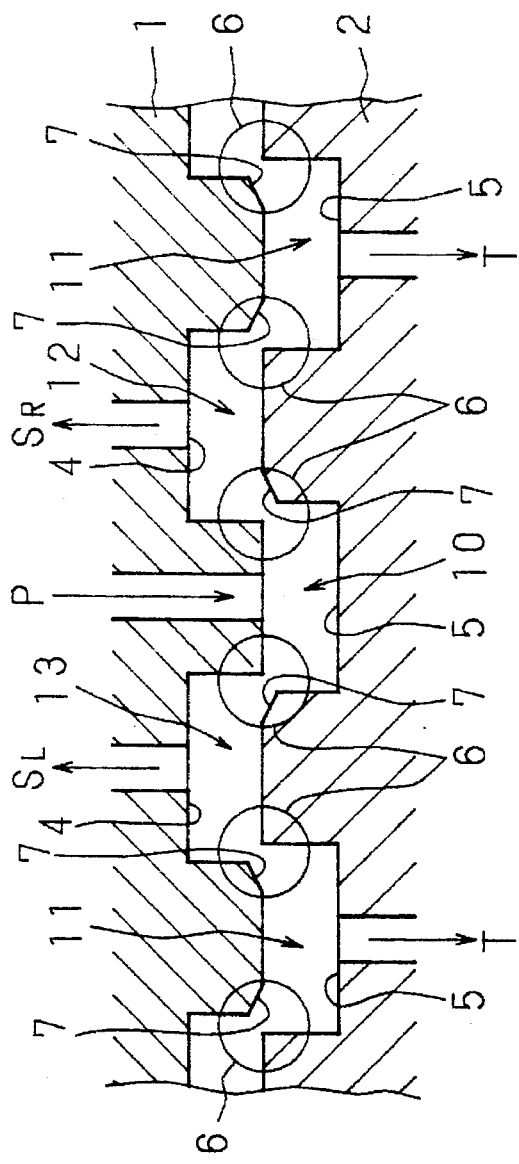
FIGS. 3A and 3B are schematic cross-sectional views exemplifying the operation of another prior art hydraulic pressure control valve designed to reduce noise due to cavitation.
Figure 3B:
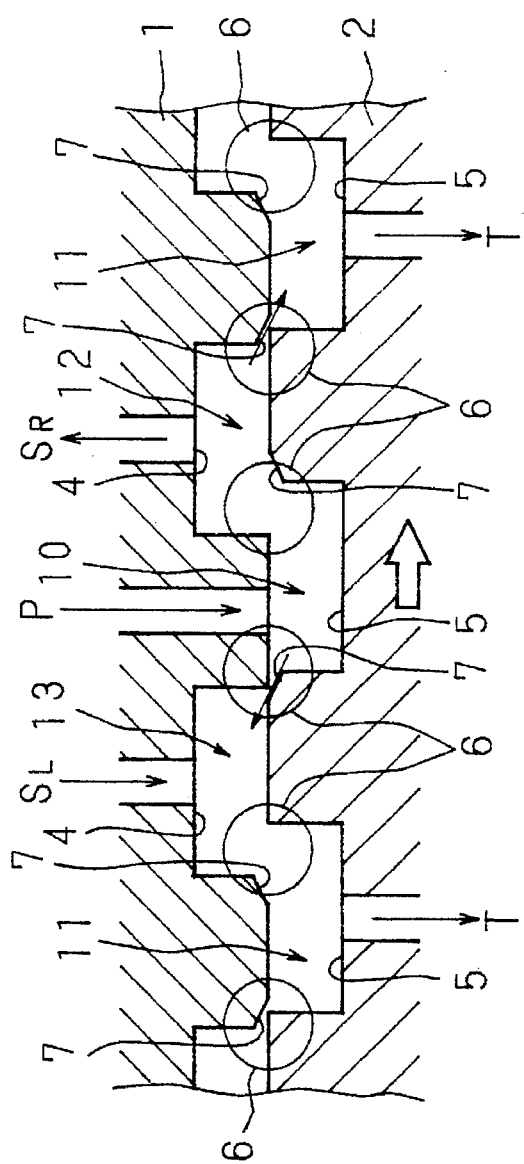
Figure 5:
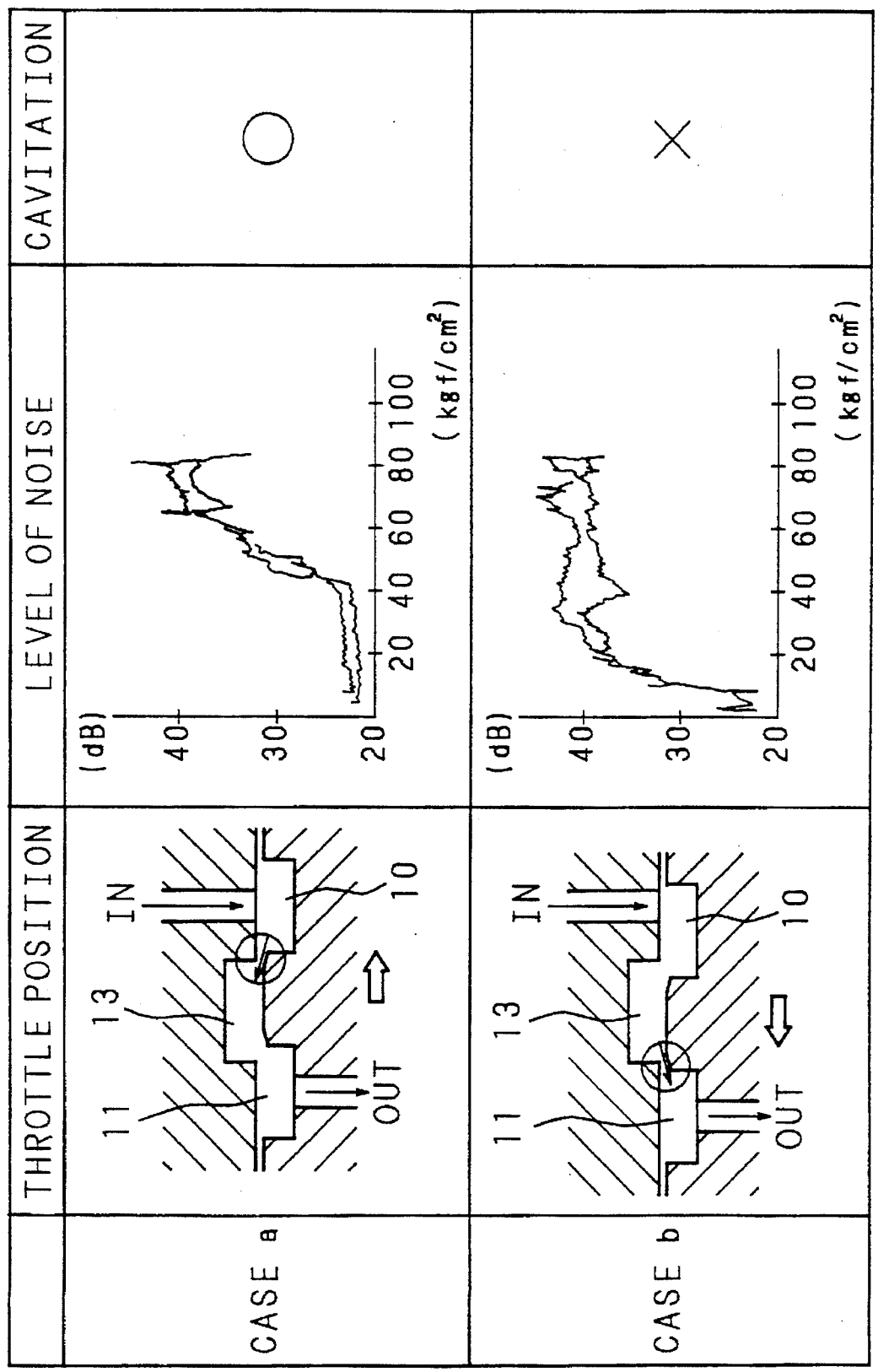
FIG. 5 is a chart showing the results of experiments conducted to examine the relationship among the condition of a throttle, noise and cavitation.

The hydraulic pressure control valve shown in FIGS. 11, 12A and 12B have the oil transfer chambers 12 and 13 constituted by the oil grooves 4 in the valve body 1, and the oil supply chamber 10 and the oil drain chamber 11 constituted by the oil grooves 4 in the valve spool 2, with the chamfered portions 7 at the corners of the valve spool 2 facing the throttle 6a or 6b. In this structure cavitation occurs as shown in FIG. 5. As will be apparent from FIG. 5, the oil flow on the throttles 6a on both sides of the oil supply chamber 10 connected to the pump P is less contributive to the occurrence of cavitation than the oil flow on the throttles 6b on both sides of the oil drain chamber 11 connected to the tank T.

Each of the hydraulic pressure control valves shown in FIGS. 11, 12A, and 12B has the lands produced in an offset arrangement between the oil grooves 5 of the valve spool 2, and has throttles 6a on both sides of the oil supply chamber 10 than the throttles 6b on both sides of the oil drain chamber 11. The difference in the width of the throttles is maintained during the operation shown in FIG. 12B, thereby ensuring that the throttle 6a between the oil supply chamber 10 and the oil transfer chamber 13 has a wider throttling extent than the throttle 6b between the oil transfer chamber 12 and the oil drain chamber 11. As a result, the oil flow from the oil supply chamber 10 to the oil drain chamber 11 is concentrated in the throttle 6a between the oil supply chamber 10 and the oil transfer chamber 13, so that a cavitation is prevented from occurring, thereby reducing noise due to cavitation.

EXAMPLE 4

Referring to FIGS. 13 and 14, EXAMPLE 4 will be described:

The exemplary valve also includes the valve body 1 having oil grooves 4 which constitute the oil transfer chambers 12 and 13, and the valve spool 2 having the oil grooves 5 which constitute the oil supply chamber 10 and oil drain chamber 11. The throttles 6a and 6b have chamfered portions 7 in the corners of the valve body 1. The oil flow pattern through each of the throttles 6a and 6b corresponds to a case where the positions of the throttles shown in FIG. 6 are turned upside down. The occurrence of cavitations is reduced equally to the case of FIG. 6 where the flow through the throttles 6b on both sides of the oil drain chamber 11 connected to the tank T is less contributive to the occurrence of capitation than the flow through the throttles 6a on both sides of the oil supply chamber 10 connected to the pump P.

Figure 14A:
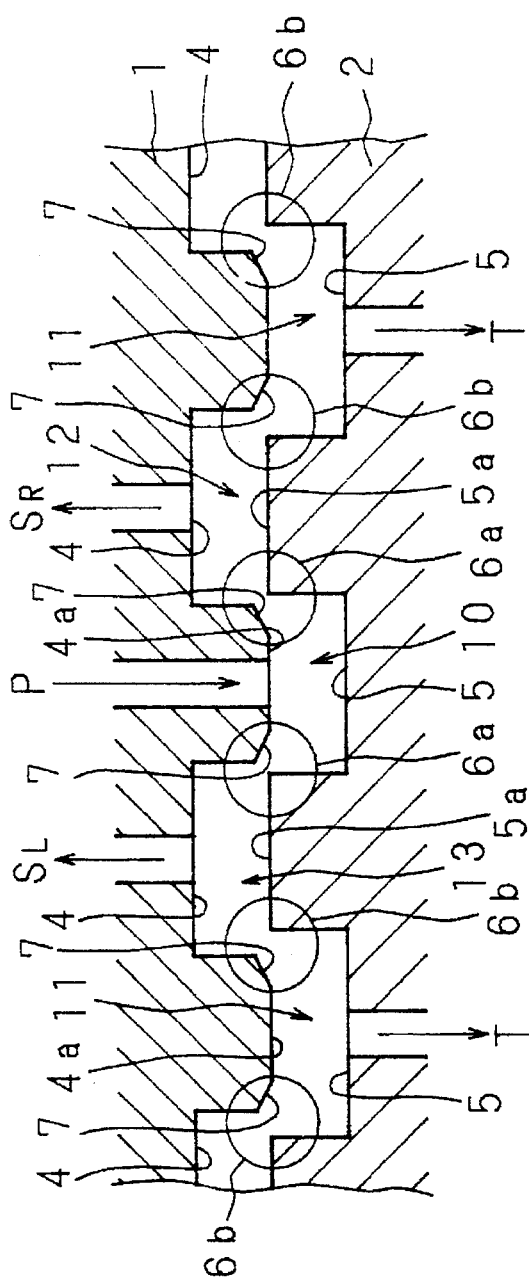
FIGS. 14A and 14B are schematic cross-sectional views exemplifying another aspect of the operation of the fourth example.
Figure 14B:
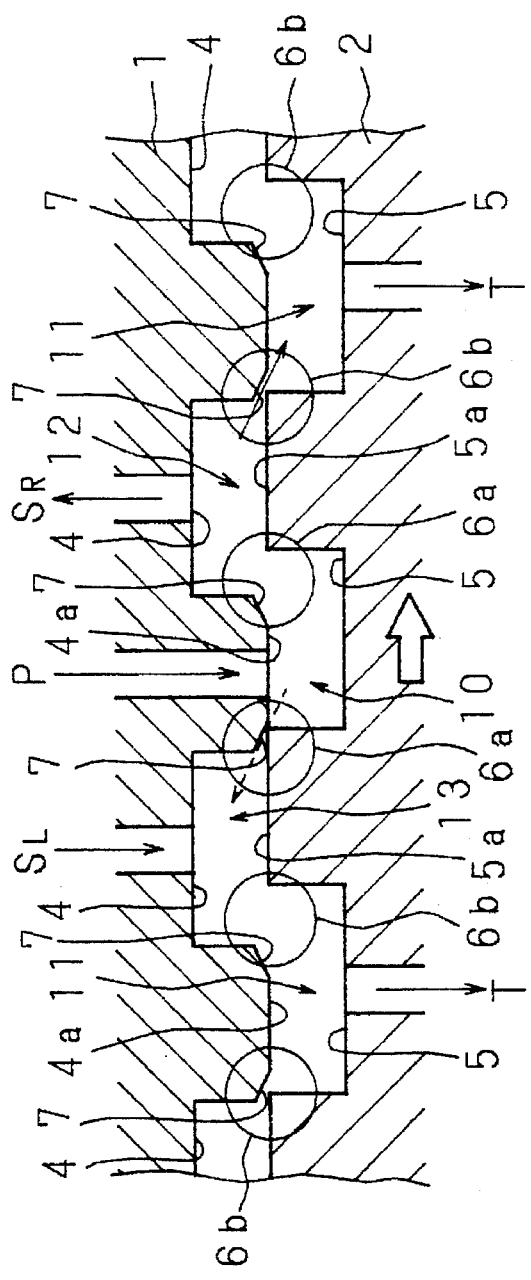

In FIGS. 13A and 13B, the oil grooves 4 of the valve body 1 are circumferentially arranged in offset positions at an equal pitch where lands having alternately different widths are formed at an equal pitch along the circumference of the valve body 1. In FIGS. 14A and 14B, the lands between the adjacent oil grooves 5 of the valve spool 2 are circumferentially arranged in offset positions; that is, the widths of the lands have alternately different widths, and are arranged at an equal pitch along the circumference of the valve body 1. In either case, the throttles 6b on both sides of the oil drain chamber 11 has a wider throttling extent than the throttle 6a on both sides of the oil supply chamber 10.

The dimensional relationship between the throttles 6a and 6b is maintained in a state where a relative angular displacement occurs between the valve body 1 and the valve spool 2 as shown in FIGS. 13B and 14B, and the throttle 6b between the oil transfer chamber 12 and the oil drain chamber 11 has a wider throttling extent than that of the throttle 6a between the oil supply chamber 10 and the oil transfer chamber 13. In this state, the oil flow from the oil supply chamber 10 to the oil drain chamber 11 is concentrated in the throttle 6b between the oil transfer chamber 12 and the oil drain chamber 11, thereby preventing the occurrence of cavitation. Thus noise due to the cavitation is reduced.

The lands shown in FIG. 14A are oppositely offset to those in FIG. 12A. The opposite offset arrangement results from which side of the valve body 1 or the valve spool 2 is provided with the chamfered portions 7. The offset arrangement of the oil grooves shown in FIG. 13A is opposite to that shown in FIG. 8A.

19

EXAMPLE 5

Referring to FIGS. 15A, 15B, 16A and 16B, EXAMPLE 5 will be described:

The hydraulic pressure control valve in the example 5 is different from those in the examples shown in FIG. 7 through FIG. 14A in that the oil grooves 4 of the valve body 1 constitute the oil supply chamber 10 and the oil drain chamber 11, and the oil grooves 5 of the valve spool 2 constitute the oil transfer chambers 12 and 13, with the chamfered portions 7 provided at the corners of the valve spool 2 to adjust throttling extent.

In Example 5 cavitations occur as shown in FIG. 6, where the oil flow through the throttles 6b on both sides of the oil drain chamber 11 is less contributive to the occurrence of cavitation than that through the throttles 6a on both sides of the oil supply chamber 10.

Figure 15A:
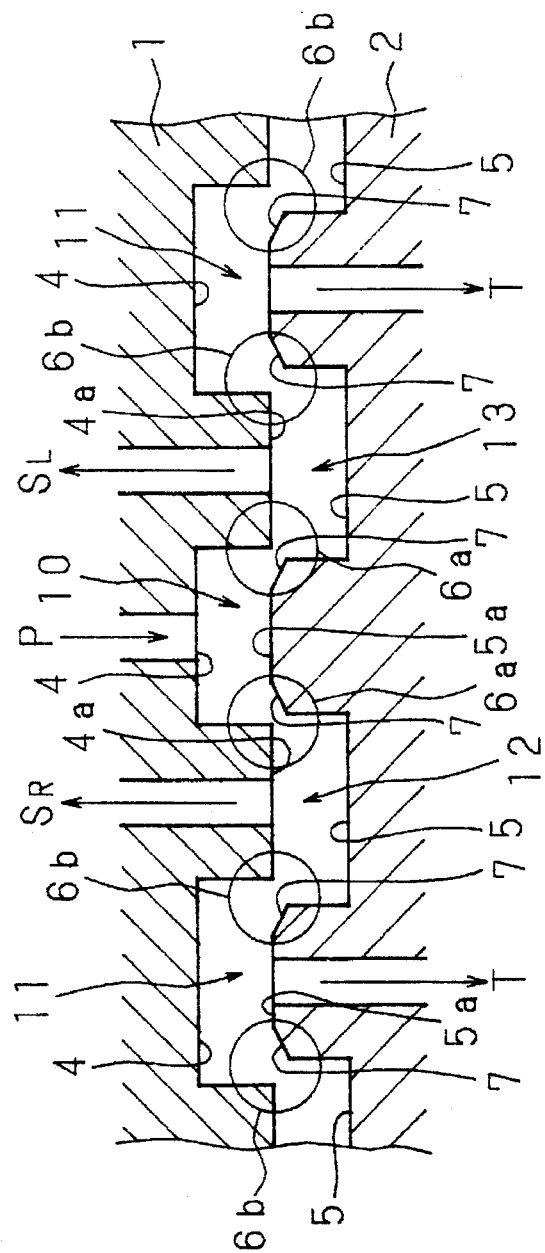
FIGS. 15A and 15B are schematic cross-sectional views exemplifying the operation of a fifth example of the present invention.
Figure 15B:
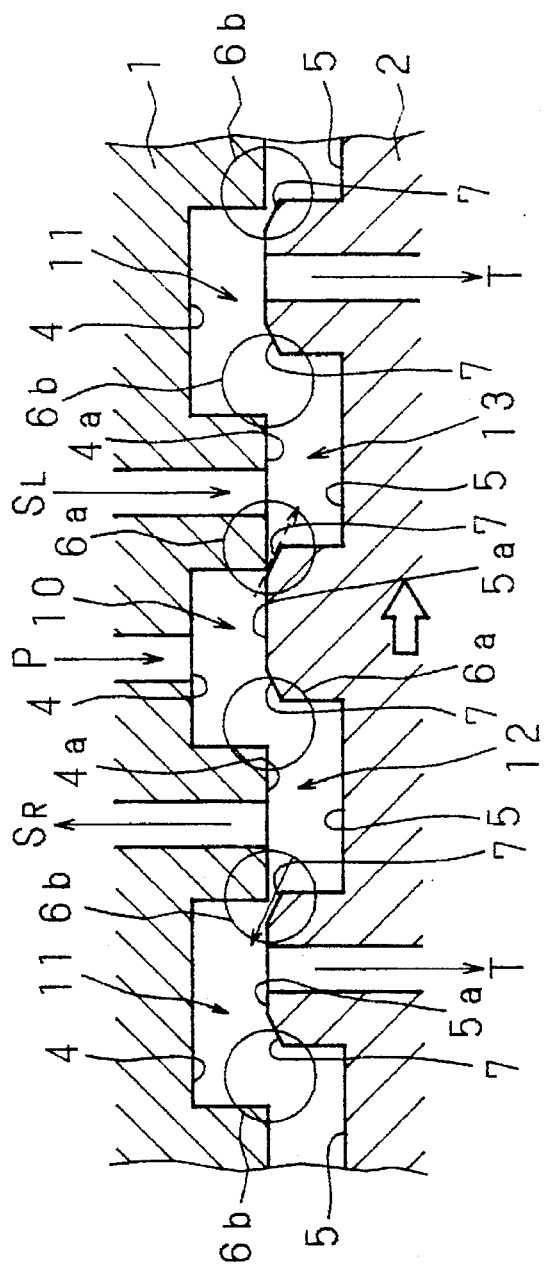

In FIGS. 15A and 15B, the lands between the adjacent oil grooves 4 of the valve body 1 are circumferentially arranged in offset positions, that is, the widths of the lands have alternately different widths, and are arranged at an equal pitch along the circumference of the valve body 1. In FIGS. 16A and 16B, the oil grooves 5 of the valve spool 2 are circumferentially arranged in offset positions; that is, the lands having alternately different widths are formed at an equal pitch along the circumference of the valve spool 2. In either case, the throttling extent of the throttles 6b on both sides of the oil drain chamber 11 is wider than that of the throttles 6a on both sides of the oil supply chamber 10.

The dimensional relationship between the throttles 6a and 6b is maintained in a state where a relative angular displacement occurs between the valve body 1 and the valve spool 2 as shown in FIGS. 15B and 16B, and the throttling extent of the throttle 6b between the oil transfer chamber 12 and the oil drain chamber 11 is wider than that of the throttle 6a between the oil supply chamber 10 and the oil transfer chamber 13. In this state, the oil flow from the oil supply chamber 10 to the oil drain chamber 11 is concentrated in the throttle 6b between the oil transfer chamber 12 and the oil drain chamber 11, thereby preventing the occurrence of cavitation. Thus noise due to the cavitation is reduced.

EXAMPLE 6

Referring to FIGS. 17A, 17B, 18A and 18B, EXAMPLE 6 will be described:

The hydraulic pressure control valve in this example is identical to those in the examples shown in FIGS. 15 and 16 in that the valve body 1 has oil grooves 4 which constitute the oil supply chambers 10 and the oil drain chamber 11, and the valve spool 2 has the oil grooves 5 which constitute the oil transfer chambers 12 and 13. The throttles 6a and 6b have chamfered portions 7 in those corners of the valve body 1 which face the respective throttles 6a and 6b, in contrast to EXAMPLE 5 shown in FIGS. 15 and 16 where the chamfered portions 7 are formed at the corners of the valve spool 2. The oil flow pattern through each of the throttles 6a and 6b corresponds to a case where the positions of the throttles shown in FIG. 5 are turned upside down. The occurrence of cavitations is reduced equally to the case of FIG. 5 where the flow through the throttles 6b on both sides of the oil supply chamber 10 is less contributive to the occurrence of cavitation than the oil flow through the throttles 6b on both sides of the oil drain chamber 11.

Figure 17A:
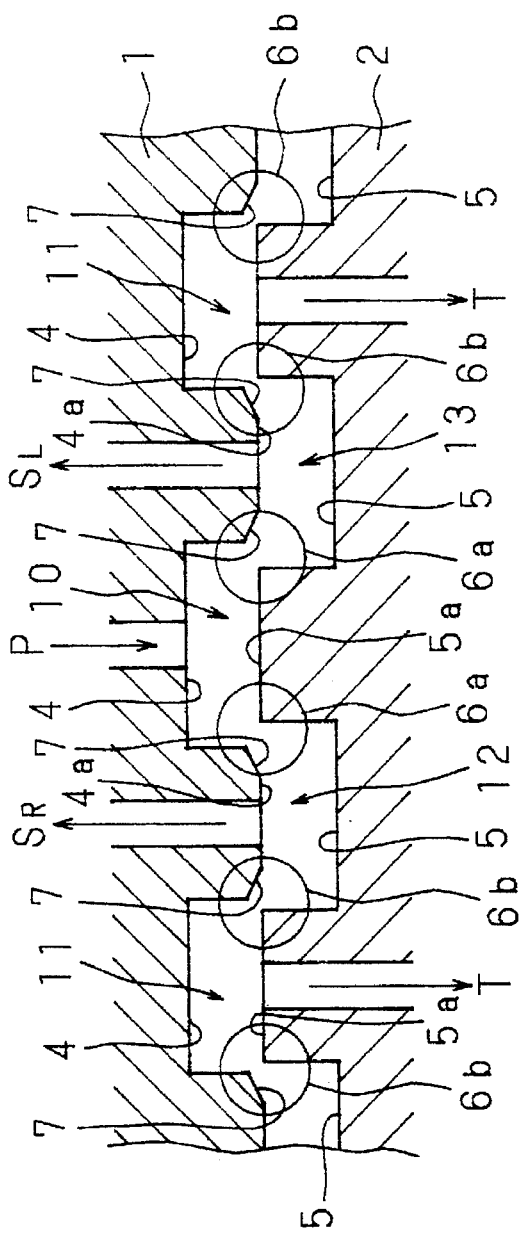
FIGS. 17A and 17B are schematic cross-sectional views exemplifying the operation of a sixth example of the present invention.
Figure 17B:
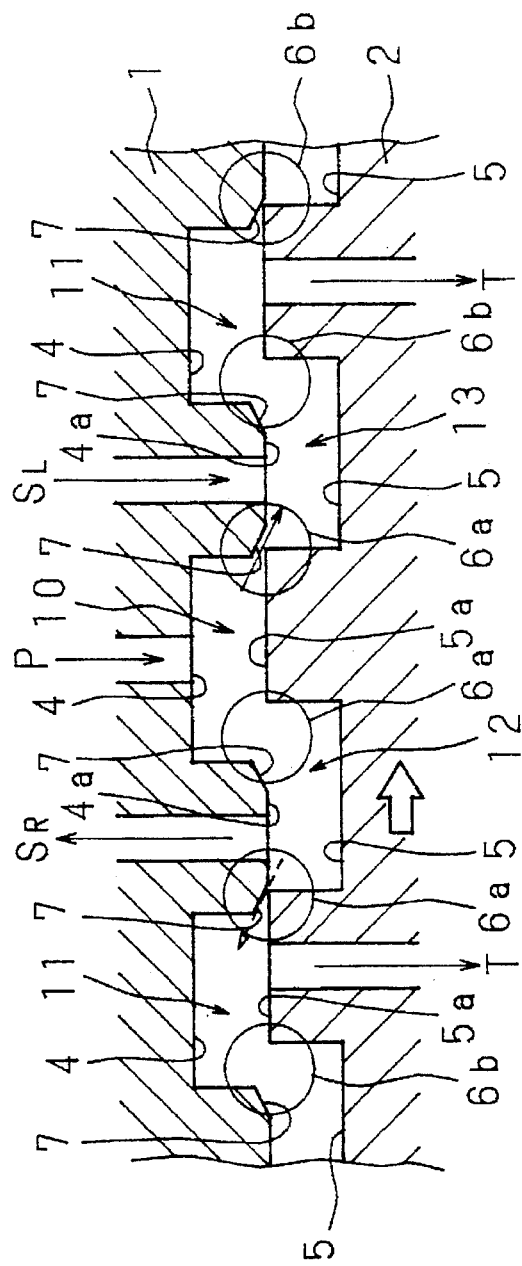
Figure 18A:
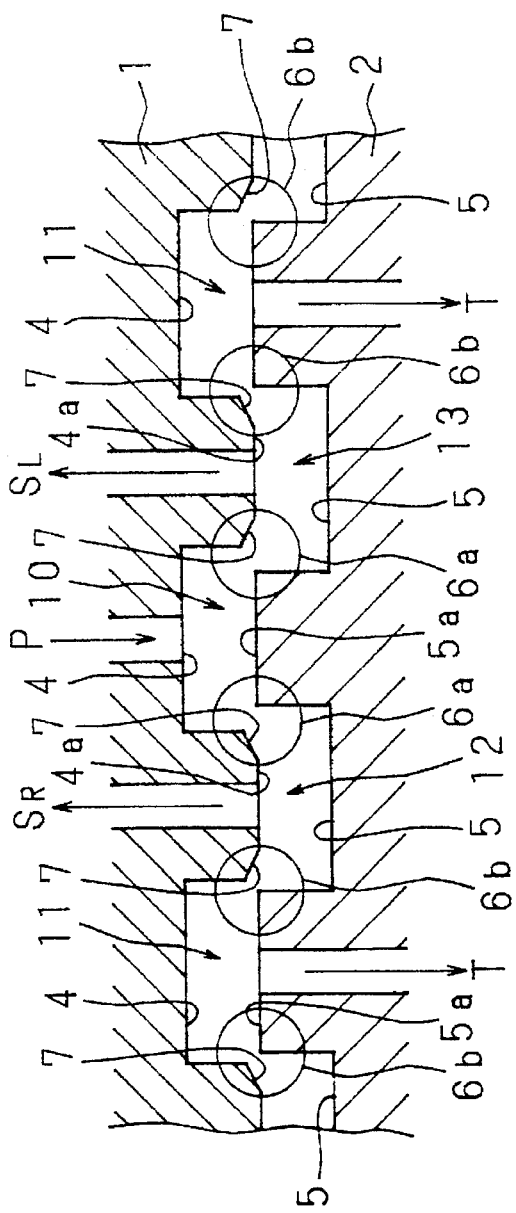
FIGS. 18A and 18B are schematic cross-sectional views exemplifying another aspect of the operation of the sixth example.
Figure 18B:
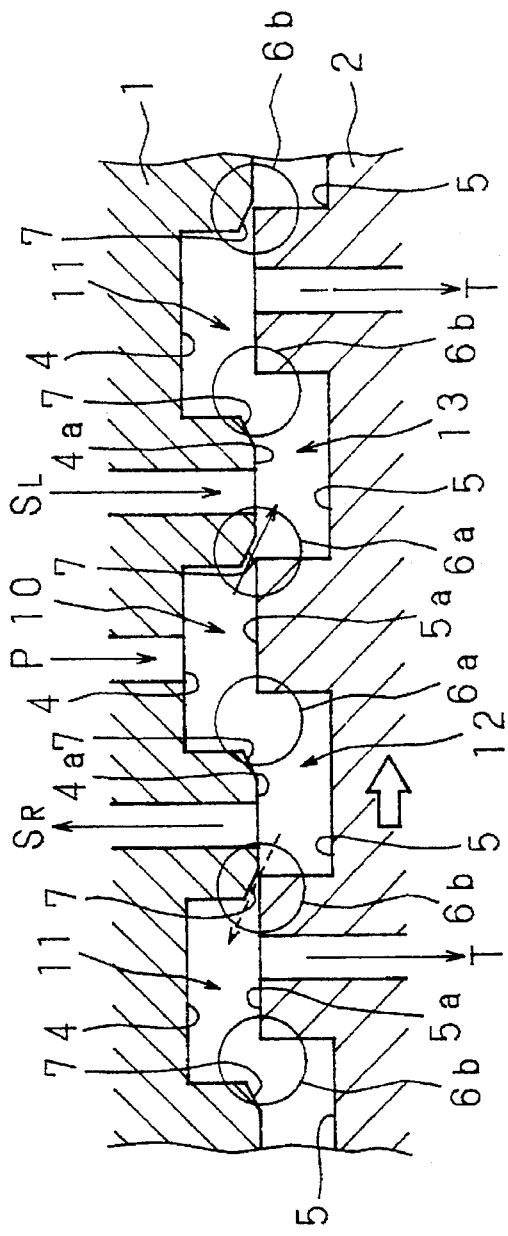

In FIGS. 17A and 17B, the lands between the adjacent oil grooves 4 of the valve body 1 are circumferentially arranged in offset positions, that is, the widths of the lands have alternately different widths, and are arranged at an equal pitch along the circumference of the valve body 1. In FIGS. 18A and 18B, the oil grooves 5 of the valve spool 2 are circumferentially arranged in offset positions; that is, the lands having alternately different widths are formed at an equal pitch along the circumference of the valve spool 2. In either case, the throttling extent of the throttles 6a on both sides of the oil supply chamber 10 is wider than that of the throttles 6b on both sides of the oil drain chamber 11. In EXAMPLE 6 the lands and oil grooves are arranged in opposite offset positions to those in FIGS. 15 and 16.

In this way the dimensional relationship is obtained owing to the offset position between the throttles 6a and 6b. This dimensional relationship is maintained in a state where a relative angular displacement occurs between the valve body 1 and the valve spool 2 as shown in FIGS. 17B and 18B, and the throttling extent of the throttle 6a between the oil supply chamber 10 and the oil transfer chamber 13 is wider than that of the throttle 6b between the oil transfer chamber 12 and the oil drain chamber 11. In this state, the oil flow from the oil supply chamber 10 to the oil drain chamber 11 is concentrated in the throttle 6a between the oil supply chamber 10 and the oil transfer chamber 13, thereby preventing the occurrence of cavitation. Thus noise due to the cavitation is reduced.

The hydraulic pressure control valve according to EXAMPLE 6 is also advantageous over the prior art hydraulic pressure control valves in that the oil grooves 4 in the valve body 1 or the lands therebetween, or the oil grooves 5 in the valve spool 2 or the lands therebetween are provided in offset arrangement, thereby causing the difference between the throttling extent the throttles 6a on both sides of the oil supply chambers 10 and the throttling extent of throttles 6b on both sides of the oil drain chamber 11, thus reducing noise, and the chamfered portions 7 can be formed without any dimensional adjustment, thereby easing the difficulty in manufacturing.

The amount of the offset arrangement is so small as a few or tens of minutes in terms of the central angle of the valve body 1 that it is liable to an error occurring in the centering between the valve body 1 and the valve spool 2. Therefore, on and along the whole periphery of the section where the valve body 1 is fitted in the valve spool 2, there may be a case where some of the throttles 6a on both sides of the oil supply chambers 10 have narrower throttling extent than some of the throttles 6b at both sides of the oil drain chambers have. Alternatively, in the hydraulic pressure control valves where the lands and the oil grooves 4 of the valve body 1, and the oil grooves 5 of the valve spool 2 and the lands are arranged at an equal pitch, they happen to be in an offset arrangement as if it is deliberately intended. As a result, some of the throttles 6 on both sides of the oil supply chambers 10 have a wider throttling extent than some of the throttles 6 on both sides of the oil drain chambers 11.

Figure 19A:
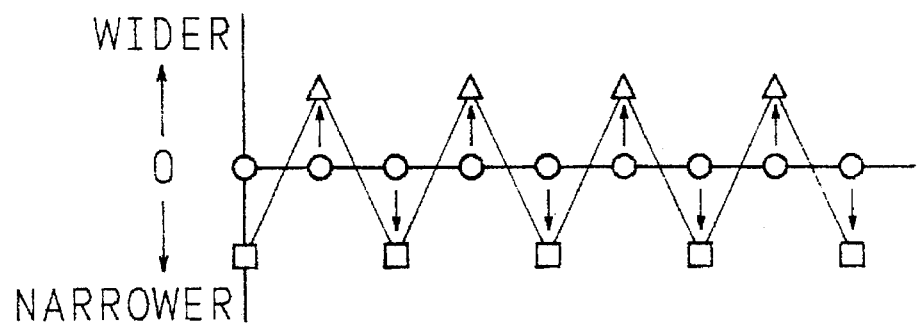
FIGS. 19A through 19C are respectively diagrammatic views exemplifying the distribution of throttling extent in the hydraulic pressure control valves of the prior art and the present invention.
Figure 19B:
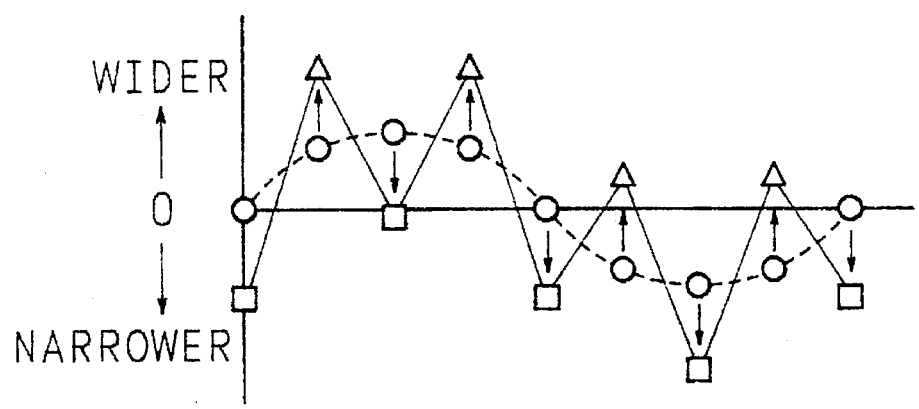
Figure 19C:
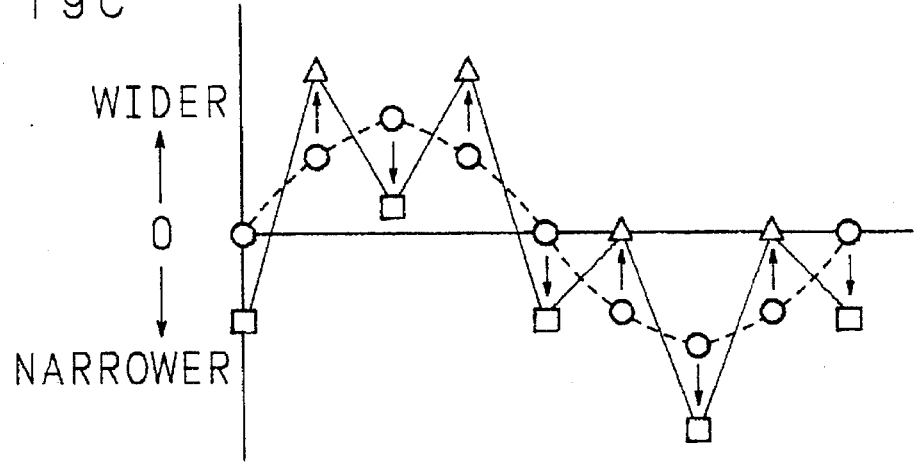

The present invention can avoid any unfavorable influences caused by an erroneous centering. Referring to FIGS. 19A, 19B and 19C, the advantage offered by the present invention will be more particularly described. In each graph the horizontal axis indicates the throttling extent of the throttles when the valve body 1 and the valve spool 2 are extended along the vertical-axis. The circles (○) indicate the throttling extent in the conventional hydraulic pressure control valve in which no offset arrangement is carried out. The triangles (△) and squares (□) indicate the throttling extent according to the present invention.

FIG. 19A represents an ideal hydraulic pressure control valve having no centering error. In the conventional hydraulic pressure control valve the throttles aligned along the facing peripheries of the valve body 1 and the valve spool 2 have the same throttling extent, whereas in the present invention the throttles (Δ) having wider throttling extent and the throttles (□) having restricted throttling extent are alternately arranged.

FIGS. 19B and 19C each represent hydraulic pressure control valves having a centering error where the inside wall of the valve body 1 along which meets the valve spool 2 have one small-diameter portion and one large-diameter portion appearing periodically as indicated by the dotted lines. In the conventional hydraulic pressure control valves the throttling extent increases and decreases with changes in the inside diameter.

In the present invention the arrangement of the throttling extent is the same as when no offset arrangement is made, that is, the wider throttling extent and the restricted throttling extent alternately exist in the same manner as shown in FIG. 19A. When, as shown in FIG. 19C, the centering error is great, some of the throttles (Δ) may have a more restricted throttling extent than some of the throttles (□) have. In this case, each of the throttling extent between the adjacent throttles is different from that of the neighboring areas. This dimensional differences alternately appear along the meeting inside walls of the valve body 1 and the valve spool 2. In this way, the present invention makes it possible to recognize the dimensional changes occurring in the throttling extent because of a centering error in a non-offset arrangement.

Figure 20A:
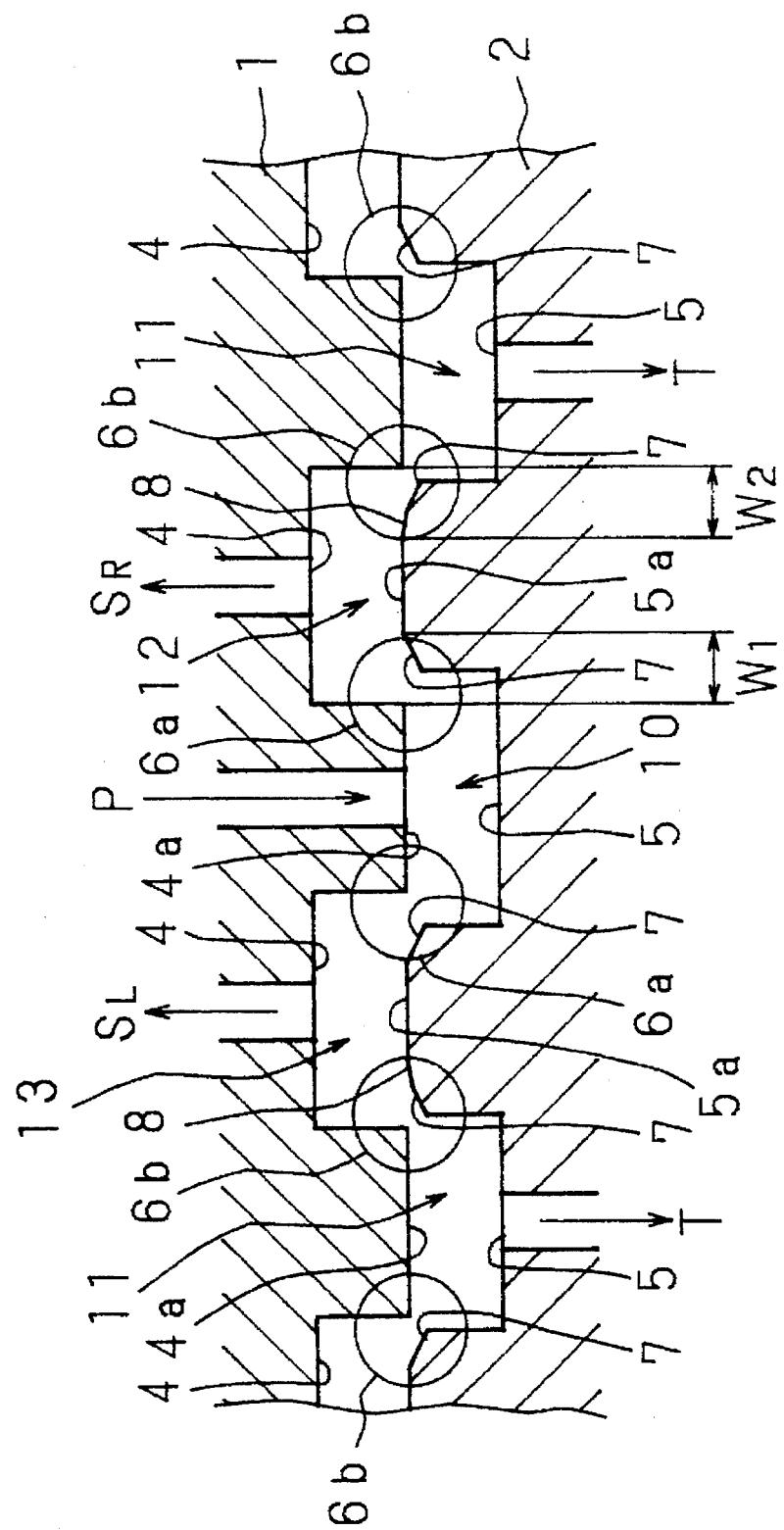
FIGS. 20A and 20B are schematic cross-sectional views exemplifying the operation of a modified version of the hydraulic pressure control valve in which chamfered portions having continuous differently slanting surfaces according to the present invention.
Figure 20B:
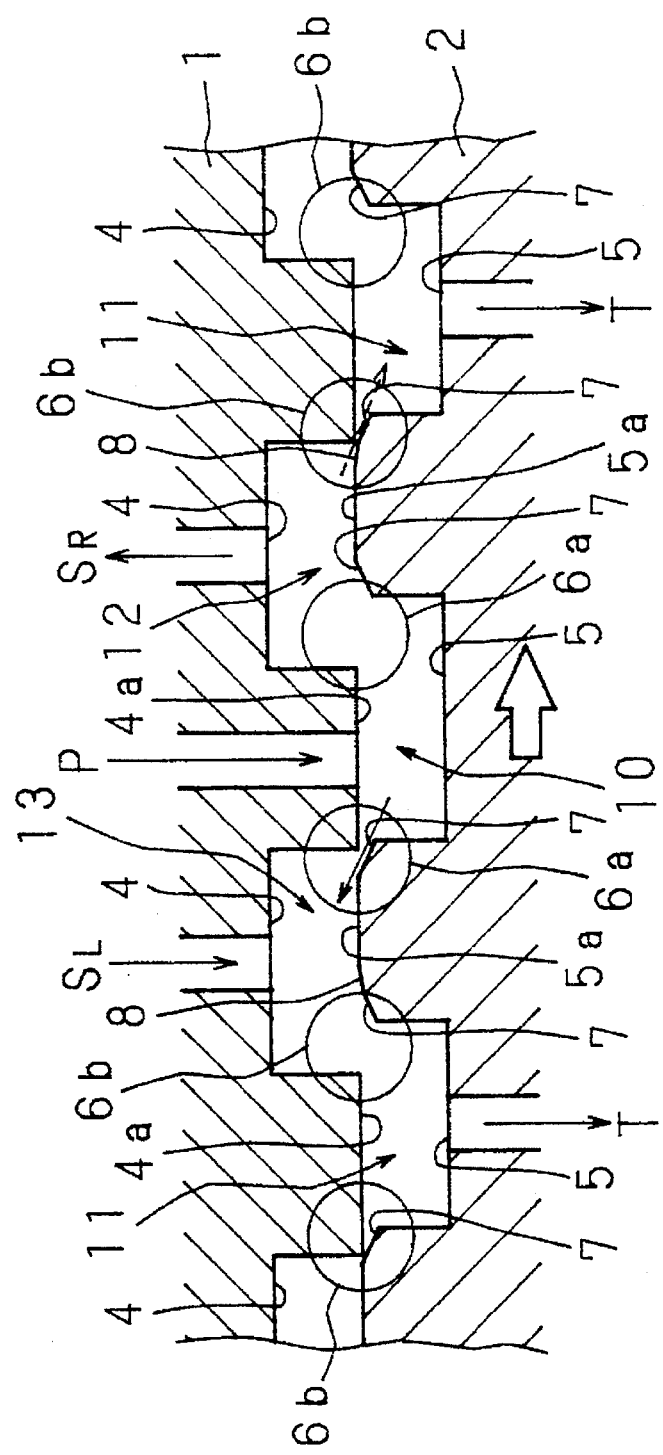
Figure 21A:
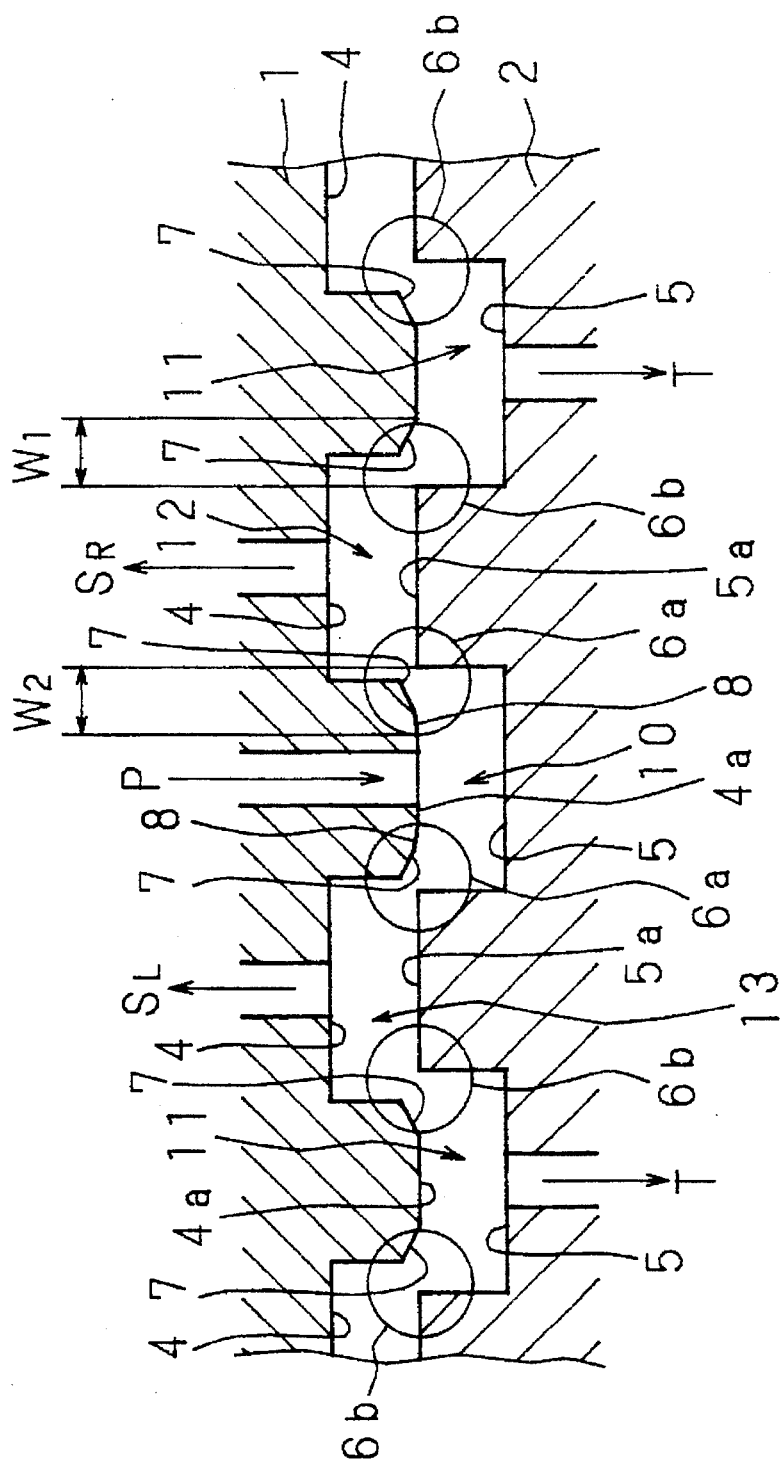
FIGS. 21A and 21B are schematic cross-sectional views exemplifying the operation of a modified version of the hydraulic pressure control valve in which chamfered portions having continuous differently slanting surfaces according to the present invention.
Figure 21B:
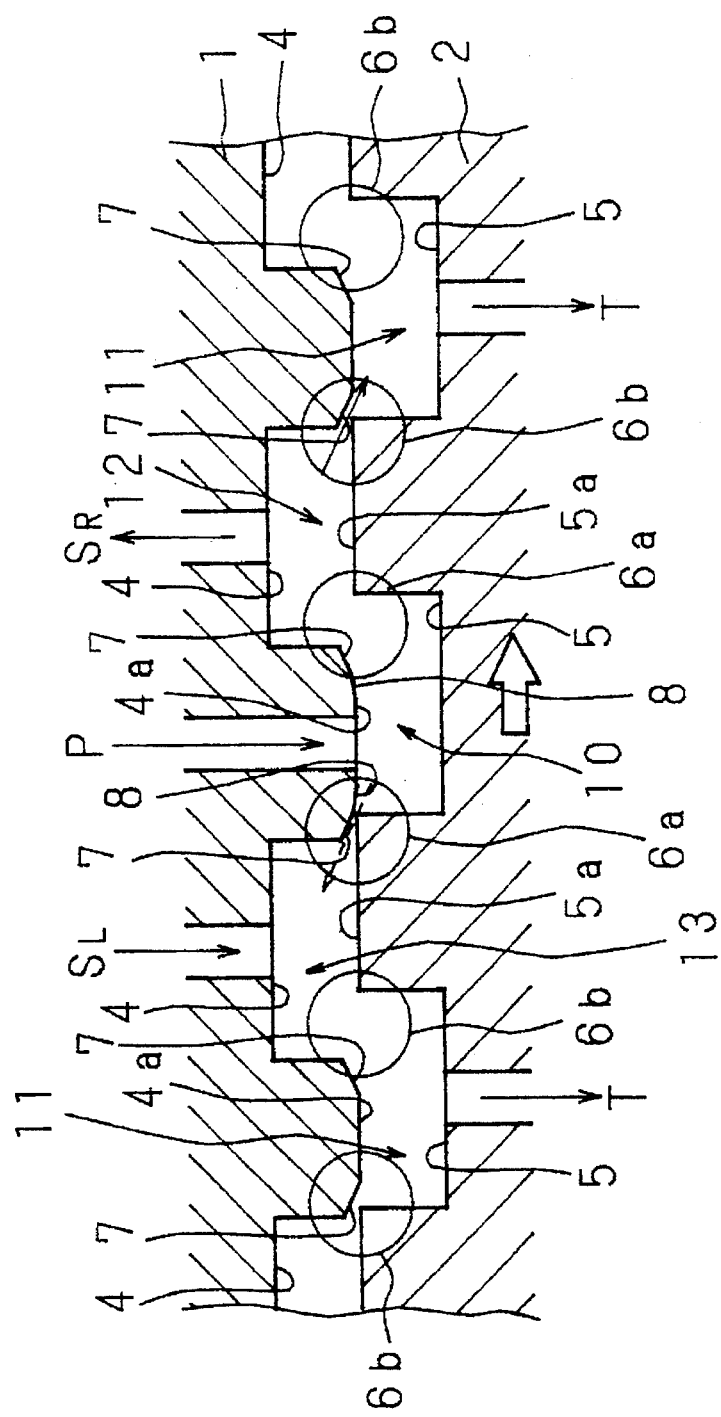
Figure 22A:
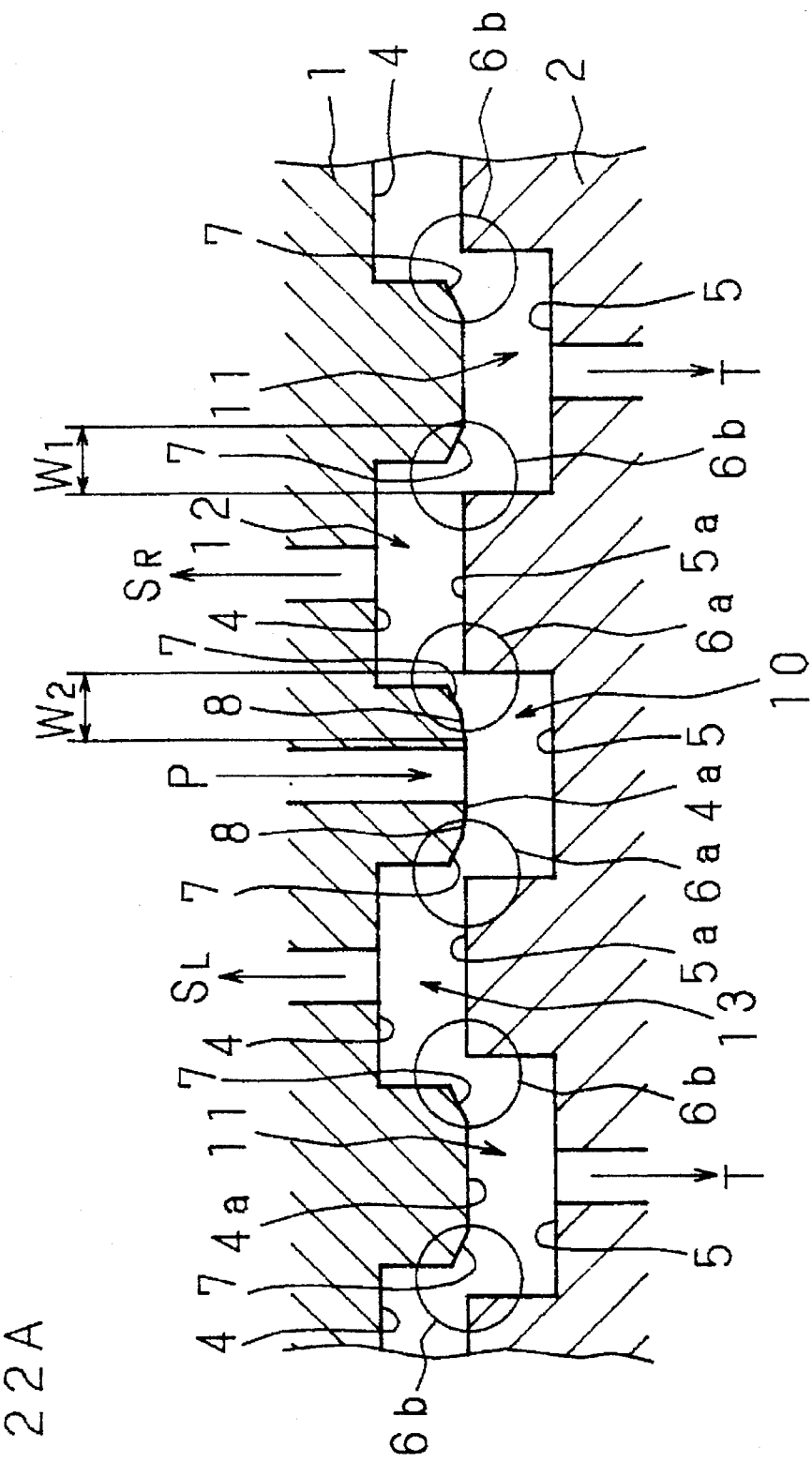
FIGS. 22A and 22B are schematic cross-sectional views exemplifying the operation of a modified version of the hydraulic pressure control valve in which chamfered portions having continuous differently slanting surfaces according to the present invention.
Figure 22B:
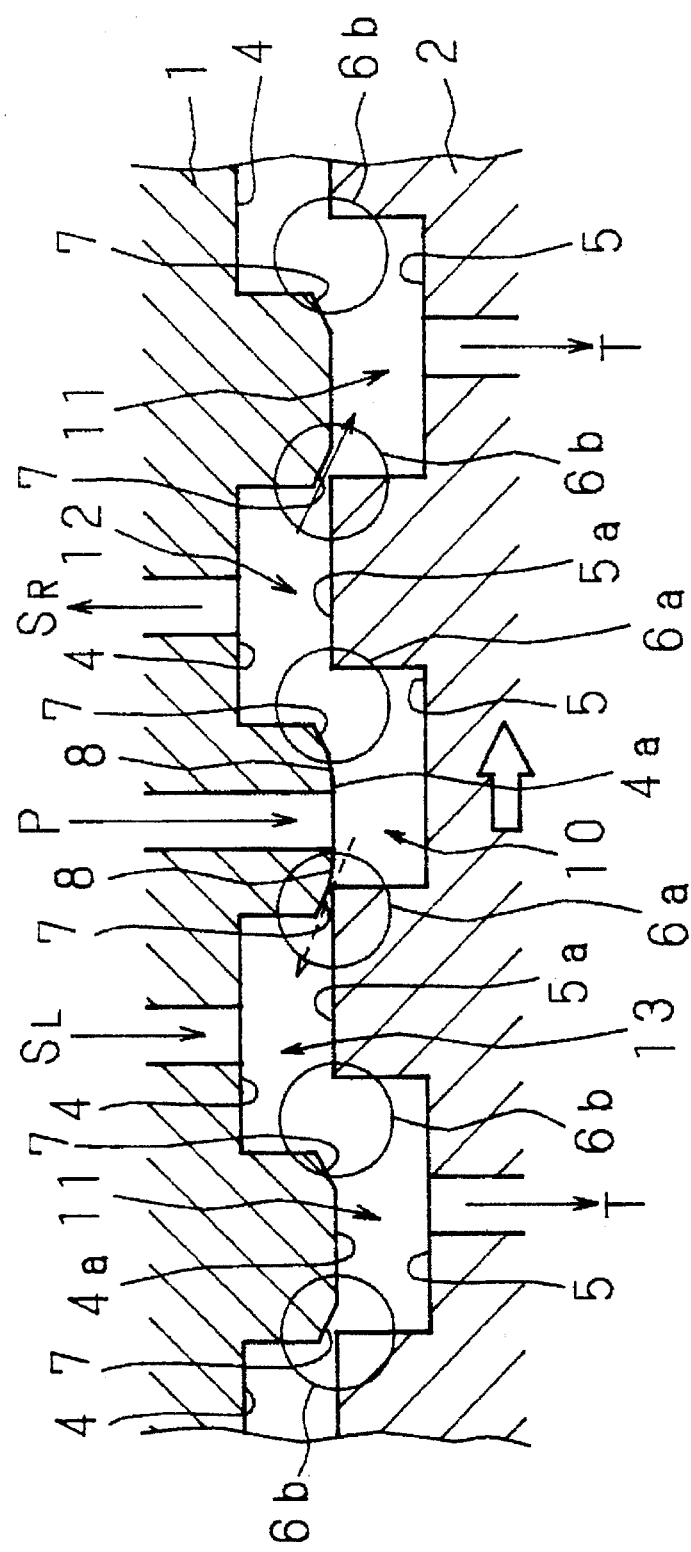
Figure 23A:
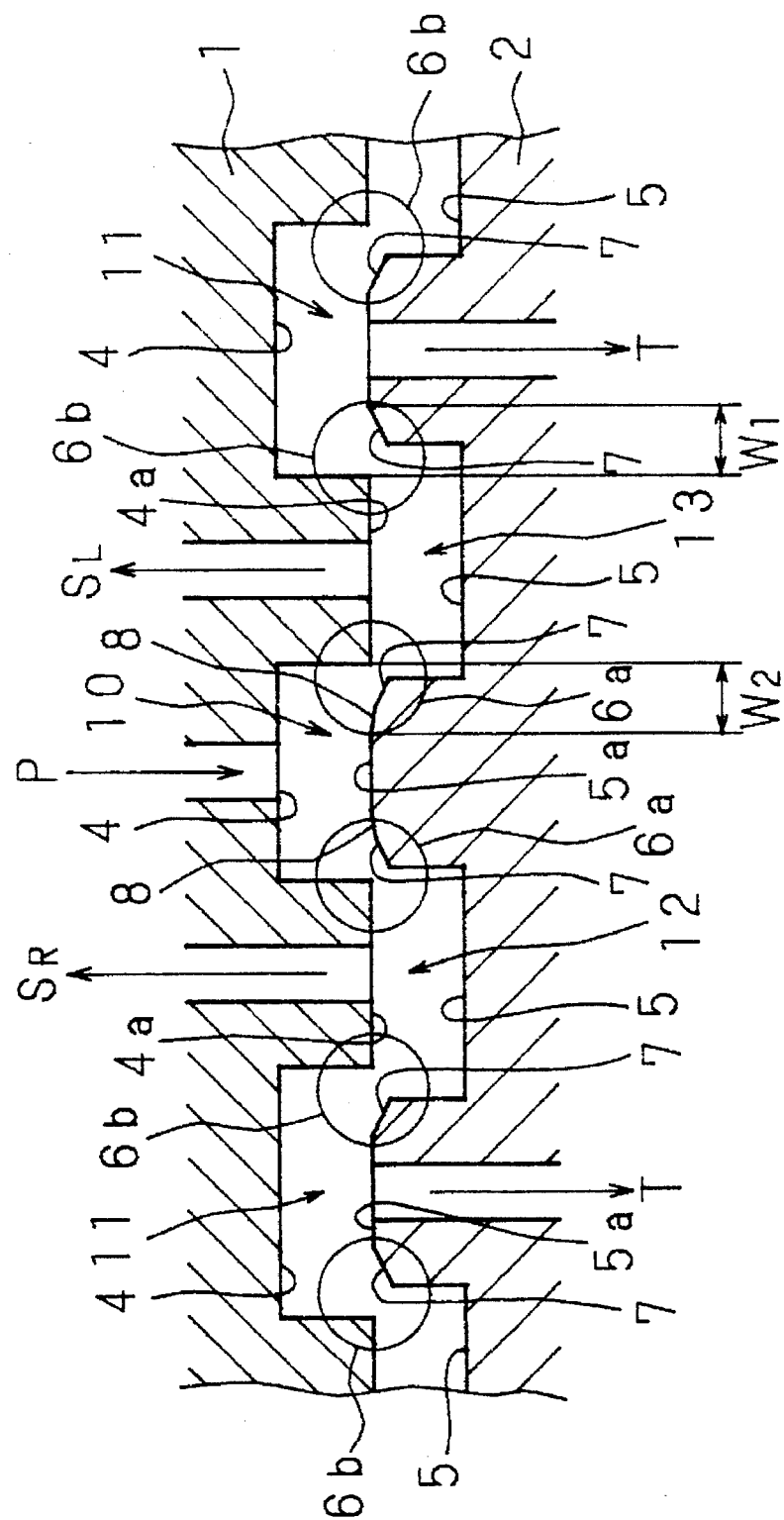
FIGS. 23A and 23B are schematic cross-sectional views exemplifying the operation of a modified version of the hydraulic pressure control valve in which chamfered portions having continuous differently slanting surfaces according to the present invention.
Figure 23B:
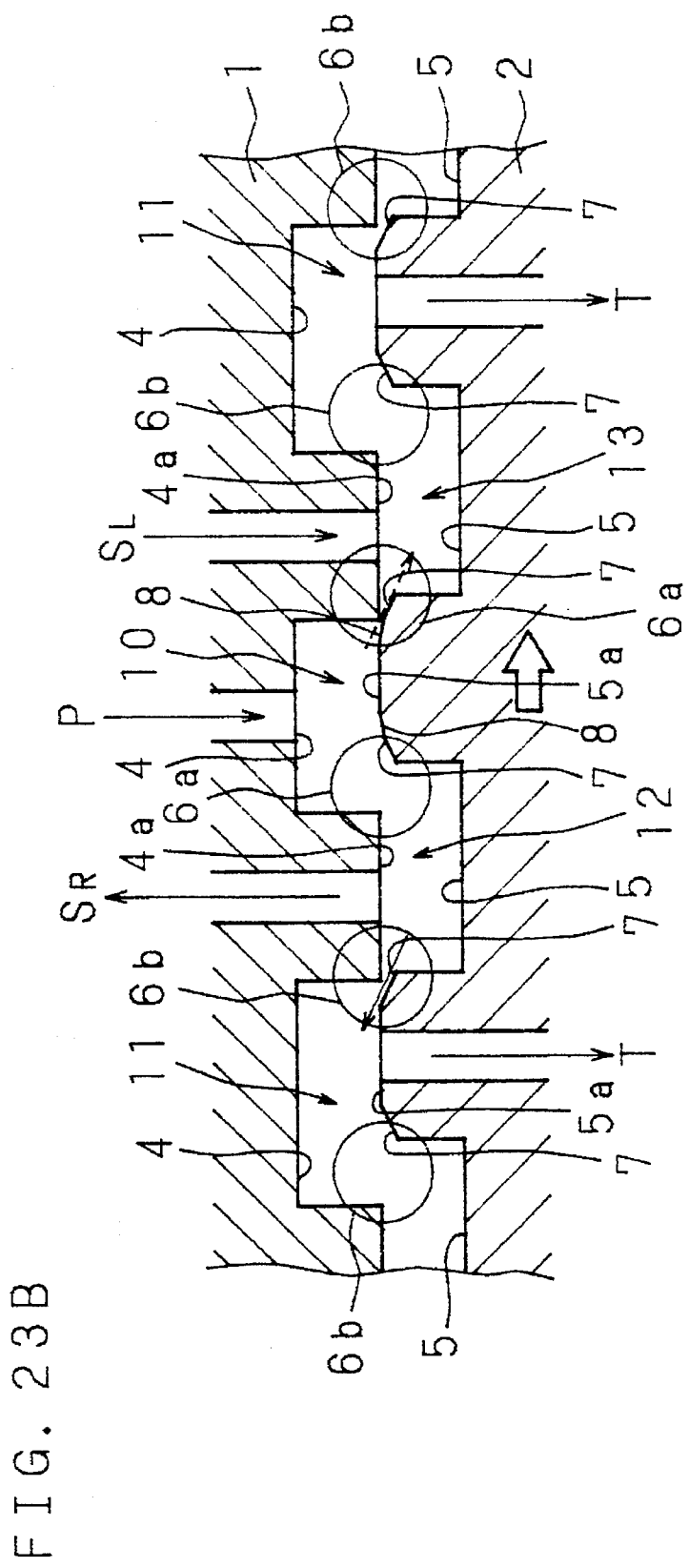
Figure 24A:
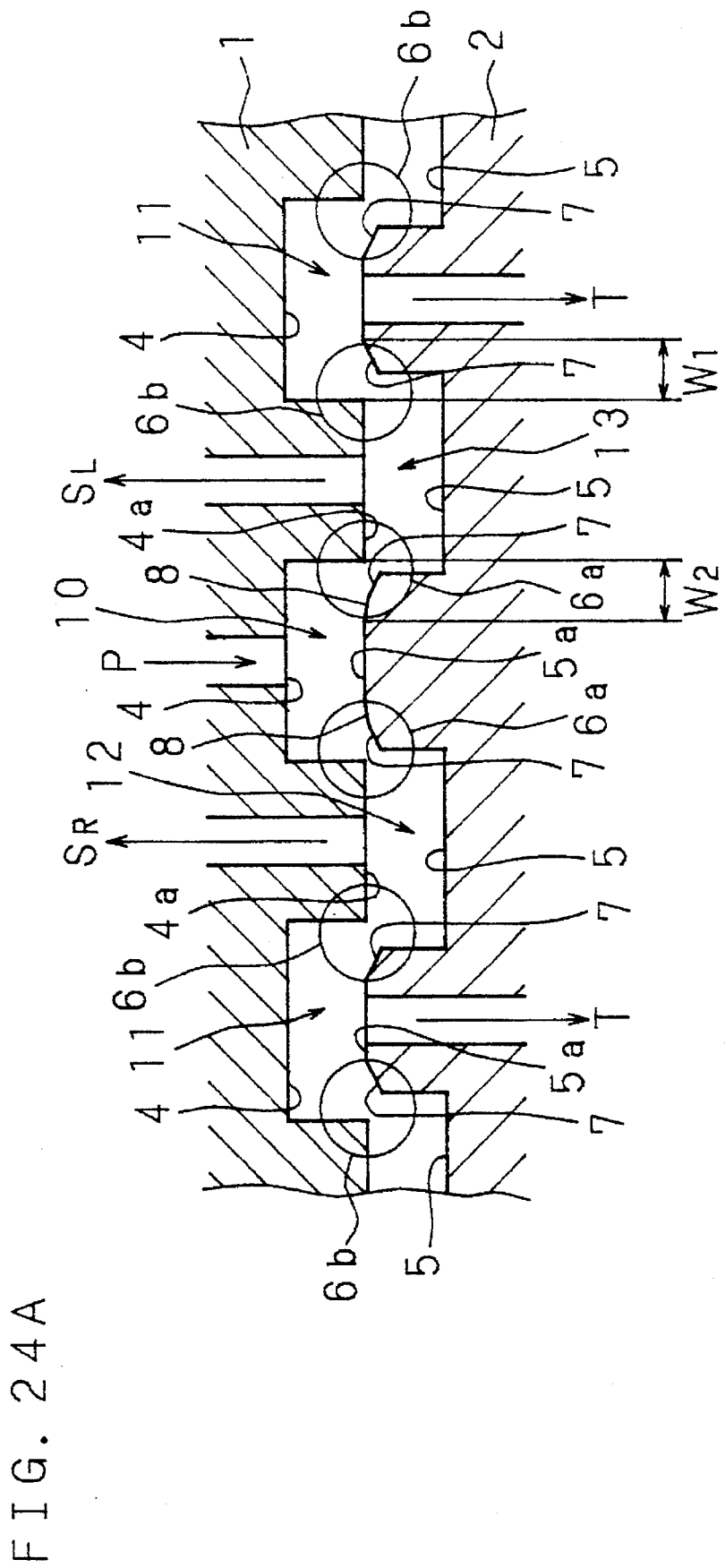
FIGS. 24A and 24B are schematic cross-sectional views exemplifying the operation of a modified version of the hydraulic pressure control valve in which chamfered portions having continuous differently slanting surfaces according to the present invention.
Figure 24B:
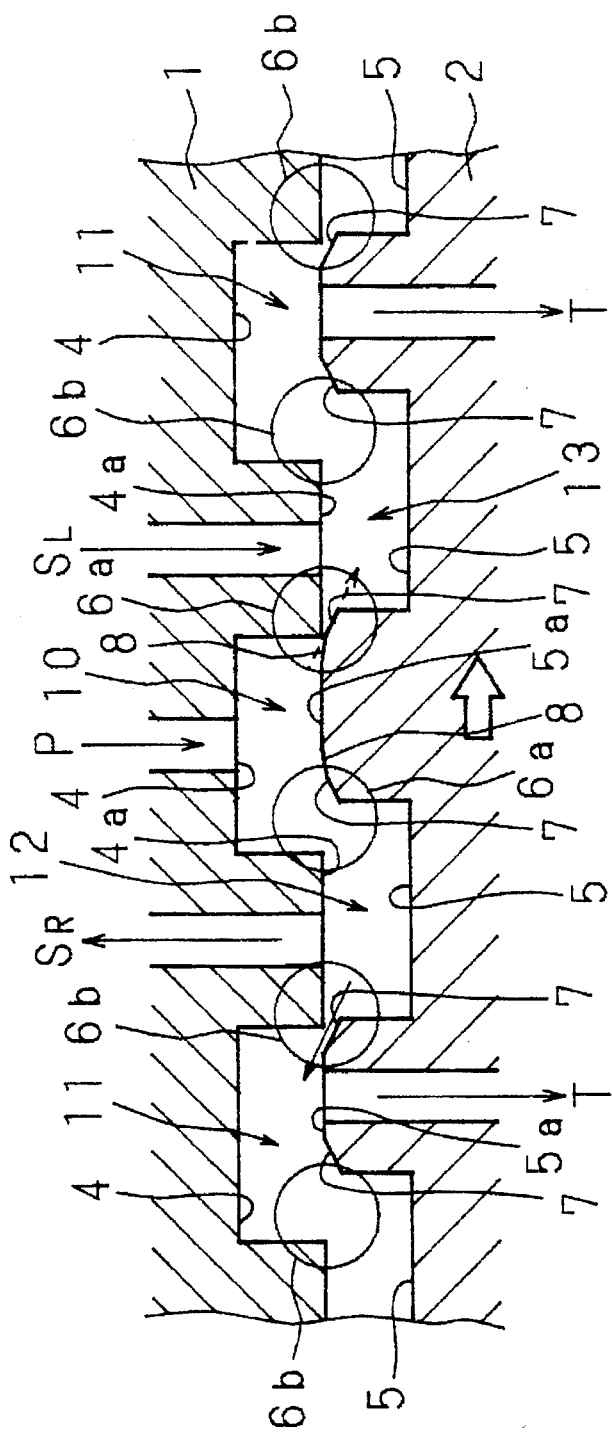
Figure 25A:
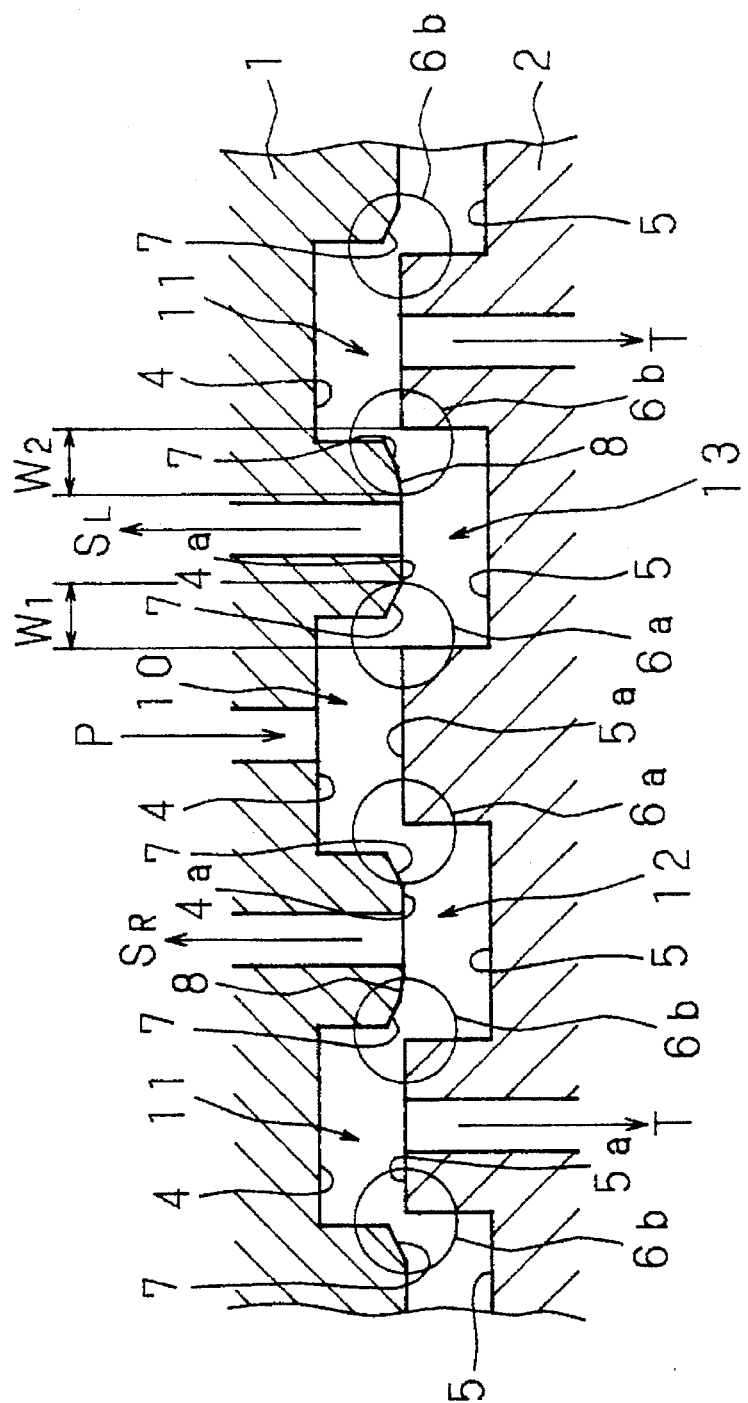
FIGS. 25A and 25B are schematic cross-sectional views exemplifying the operation of a modified version of the hydraulic pressure control valve in which chamfered portions having continuous differently slanting surfaces according to the present invention.
Figure 25B:
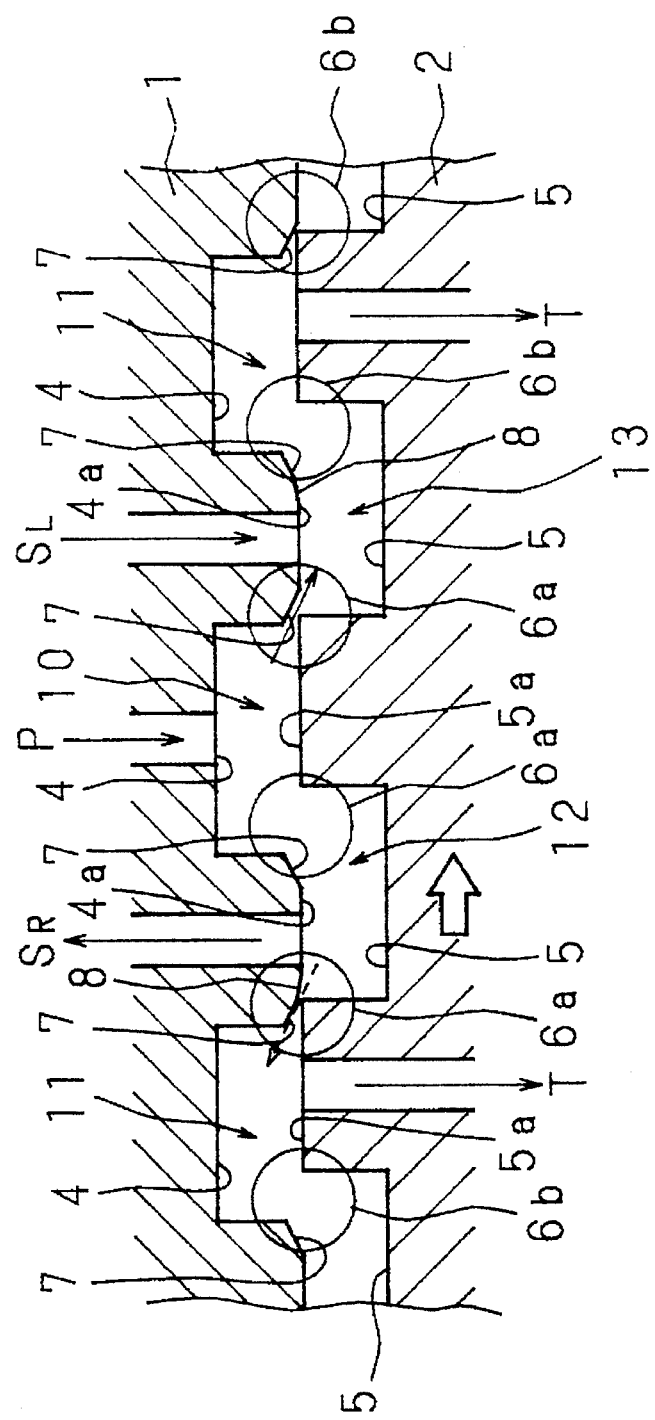
Figure 26A:
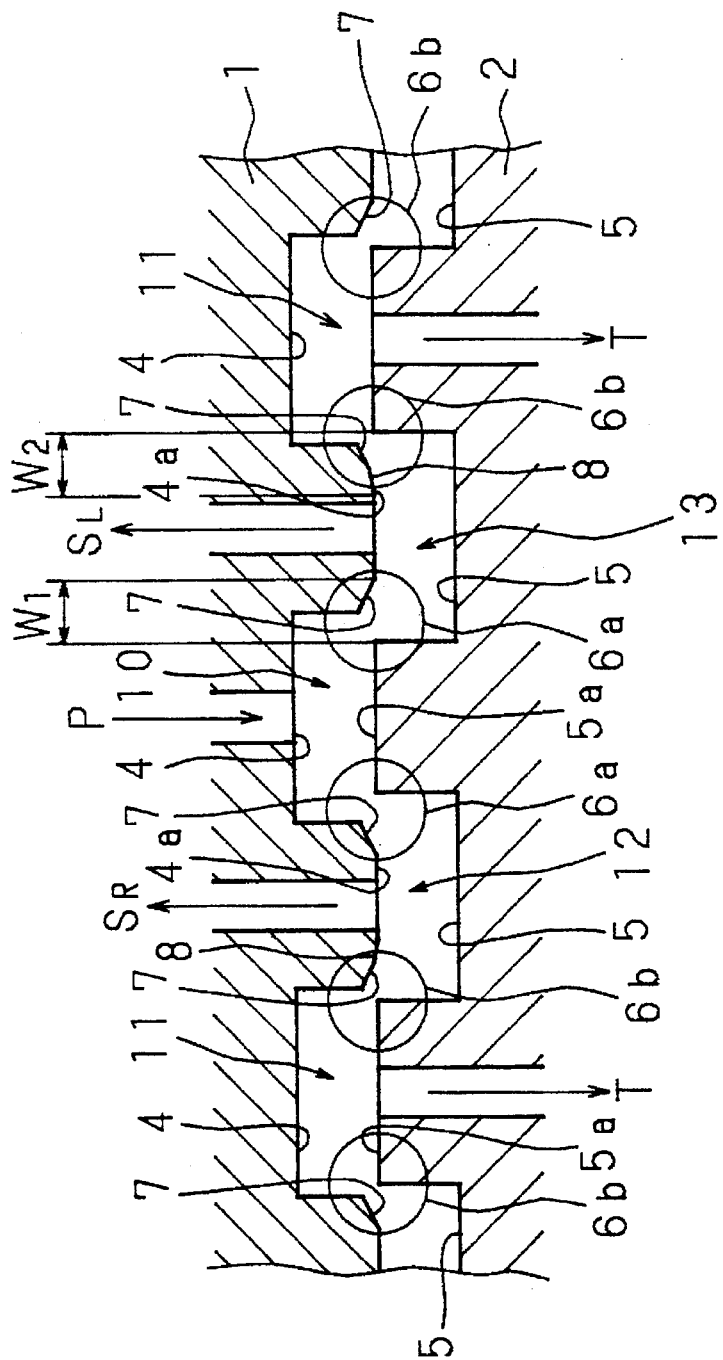
FIGS. 26A and 26B are schematic cross-sectional views exemplifying the operation of a modified version of the hydraulic pressure control valve in which chamfered portions having continuous differently slanting surfaces according to the present invention.
Figure 26B:
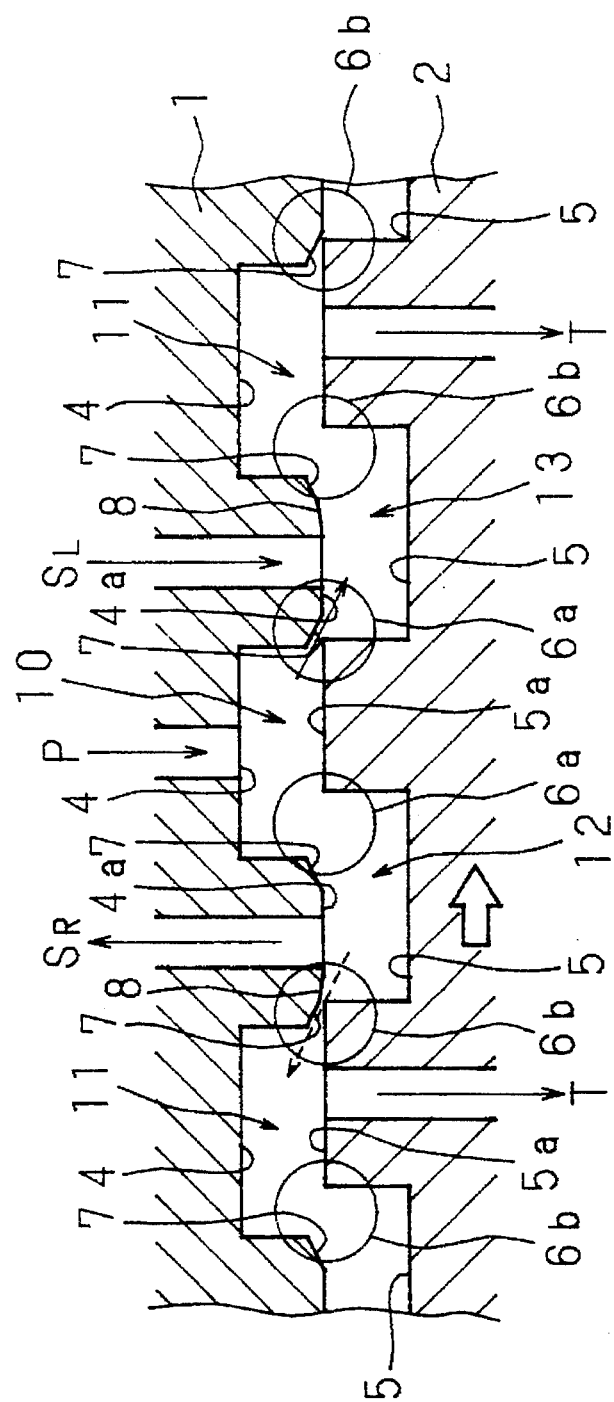

In the hydraulic pressure control valves shown in FIGS. 12A to 18B, when the relative angular displacement is great between the valve body 1 and the valve spool 2, noise can be reduced by providing the side of the corner of each oil groove 5 facing the respective throttle 6b with a second chamfered portion 8. The hydraulic pressure control valves corresponding to FIGS. 12A and 12B are shown in FIGS. 20A and 20B. Those shown in FIGS. 13A and 13B are shown in FIGS. 21A and 21B. Those shown in FIGS. 14A and 14B are shown in FIGS. 22A and 22B. Those shown in FIGS. 15A and 15B are shown in FIGS. 23A and 23B. Those shown in FIGS. 16A and 16B are shown in FIGS. 24A and 24B. Those shown in FIGS. 17A and 17B are shown in FIGS. 25A and 25B. Those shown in FIGS. 18A and 18B are shown in FIGS. 26A and 26B. In these examples the chamfered portions facing the throttles which are restricted in the neutral state are further chamfered as second chamfered portions. The same advantages as those offered by Example 2 are shown in FIGS. 9A and 9B.

EXAMPLES 1 to 6 have been described by taking for an example a hydraulic pressure control valve which controls hydraulic pressure delivered to a hydraulic cylinder in a power steering apparatus. However, the present invention is not limited to such hydraulic pressure control valves but can be applied to any other rotary hydraulic pressure control valves used in hydraulic circuits.

As mentioned above, the hydraulic pressure control valve of the present invention have the difference between the throttle on both sides of the oil supply chamber and the throttle on both sides of the oil drain chamber, such that a flow of the working oil from the oil supply chamber to the oil drain chamber is concentrated in the throttles which are less contributive to the occurrence of cavitation. As a result, the present invention does not require complicated manufacturing process, reducing noise due to the cavitation regardless of the structure.

As this invention may be embodied in several forms without departing from the spirit of essential characteristics thereof, the examples given are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A hydraulic pressure control valve comprising:
   a cylindrical valve body having first oil grooves and first lands alternately provided on and along the peripheral inside surface; and
   a cylindrical valve spool coaxially fitted in the valve body to allow a relative angular displacement therebetween, the valve spool having second oil grooves arranged in zigzag positions with the first oil grooves and second lands provided alternately with the second oil grooves on and along the peripheral outside surface;
   wherein the second oil grooves constitute oil supply chambers connected to an oil supply source and oil drain chambers connected to an oil drain end, and the first oil grooves constitute oil transfer chambers connected to the oil transfer end through the oil supply chambers and the oil drain chambers on both sides thereof, each of the first and second adjacent oil grooves constituting throttles therebetween, and the throttling extent being changeable in accordance with the relative angular displacement between said spool and said valve body;
   each of the second lands having chamfered portions at the corners, the chamfered portions being slanted to the peripheral top surface thereof toward the respective throttles; and
   the first oil grooves are circumferentially provided in offset arrangement such that the throttles on both sides of the oil supply chambers are of larger width relative to the throttles on both sides of the oil drain chambers.

2. The hydraulic pressure control valve according to claim 1, wherein each of the chamfered portions slanted toward the throttles are on both sides of the oil drain chambers.

3. A hydraulic pressure control valve comprising:
   a cylindrical valve body having first oil grooves and first lands provided with an equal pitch alternately with the first oil grooves on and along the peripheral inside surface; and
   a cylindrical valve spool coaxially fitted in the valve body to allow a relative angular displacement therebetween, the valve spool having second oil grooves arranged in zigzag positions with the first oil grooves, and second lands alternately provided with the second oil grooves on and along the peripheral outside surface;
   wherein the second oil grooves constitute oil supply chambers connected to an oil supply source and oil drain chambers connected to an oil drain end, and the first oil grooves constitute oil transfer chambers connected to the oil transfer end through the oil supply chambers and the oil drain chambers on both sides thereof, each of the first and second adjacent oil grooves constituting throttles therebetween, and the throttling extent being changeable in accordance with the relative angular displacement between said spool and said valve body;
   each of the second lands having chamfered portions at the corners, the chamfered portions being slanted to the peripheral top surface thereof toward the respective throttles; and
   the adjacent first lands are arranged with circumferentially different widths such that the throttles on both sides of the oil supply chambers are of larger width relative to the throttles on both sides of the oil drain chambers.

4. The hydraulic pressure control valve according to claim 3, wherein each of the chamfered portions slanted toward the throttles are on both sides of the oil drain chambers.

5. A hydraulic pressure control valve comprising:

a cylindrical valve body having first oil grooves and first lands alternately provided on and along the peripheral inside surface; and a cylindrical valve spool coaxially fitted in the valve body to allow a relative angular displacement therebetween, the valve spool having second oil grooves arranged in zigzag positions with the first oil grooves and second lands alternately provided with the second oil grooves on and along the peripheral outside surface;

wherein the second oil grooves constitute oil supply chambers connected to an oil supply source and oil drain chambers connected to an oil drain end, and the first oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the second lands having chamfered portions at the corners, the chamfered portions being slanted to the peripheral top surface thereof toward the respective throttles; and the second lands are circumferentially provided in an offset arrangement such that the throttles on both sides of the oil supply chambers are of larger width relative to the throttles on both sides of the oil drain chambers.

6. The hydraulic pressure control valve according to claim 5, wherein each of the chamfered portions slanted toward the throttles are on both sides of the oil drain chambers.

7. A hydraulic pressure control valve comprising:

a cylindrical valve body having first oil grooves and first lands alternately provided on and along the peripheral inside surface; and a cylindrical valve spool coaxially fitted in the valve body so as to allow a relative angular displacement therebetween, the valve spool having second oil grooves arranged with an equal pitch in zigzag positions with the first oil grooves, and second lands provided alternately with the second oil grooves on and along the peripheral outside surface;

wherein the second oil grooves constitute oil supply chambers connected to an oil supply source and oil drain chambers connected to an oil drain end, and the first oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the second lands having chamfered portions at the corners, the chamfered portions being slanted to the peripheral top surface thereof toward the respective throttles; and the adjacent second oil grooves are arranged with circumferentially different widths such that the throttles on both sides of the oil supply chambers are of larger width relative to the throttles on both sides of the oil drain chambers.

8. The hydraulic pressure control valve according to claim 7, wherein each of the chamfered portions slanted toward the throttles are on both sides of the oil drain chambers.

9. A hydraulic pressure control valve comprising:

a cylindrical valve body having first oil grooves and first lands alternately provided on and along the peripheral inside surface; and a cylindrical valve spool coaxially fitted in the valve body to allow a relative angular displacement therebetween, the valve spool having second oil grooves arranged in zigzag positions with the first oil grooves and second lands alternately provided with the second oil grooves on and along the peripheral outside surface;

wherein the second oil grooves constitute oil supply chambers connected to an oil supply source and oil drain chambers connected to an oil drain end, and the first oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the first lands having chamfered portions at the corners, the chamfered portions being slanted to the peripheral top surface thereof toward the respective throttles; and the first oil grooves are circumferentially provided in an offset arrangement such that the throttles on both sides of the oil drain chambers are of larger width relative to the throttles on both sides of the oil supply chambers.

10. The hydraulic pressure control valve according to claim 9, wherein each of the chamfered portions slanted toward the throttles are on both sides of the oil supply chambers.

11. A hydraulic pressure control valve comprising:

a cylindrical valve body having first oil grooves and first lands provided with an equal pitch alternately with the first oil grooves on and along the peripheral inside surface; and a cylindrical valve spool coaxially fitted in the valve body to allow a relative angular displacement therebetween, the valve spool having second oil grooves arranged in zigzag positions with the first oil grooves, and second lands alternately provided with the second oil grooves on and along the peripheral outside surface;

wherein the second oil grooves constitute oil supply chambers connected to an oil supply source and oil drain chambers connected to an oil drain end, and the first oil grooves constitute oil transfer chambers connected to the oil transfer end through the oil supply chambers and oil drain chambers on both sides thereof, each of the first and second adjacent oil grooves constituting throttles therebetween, the throttling extent being changeable in accordance with the relative angular displacement of said spool relative to said valve body;

each of the first lands having chamfered portions at the corners, the chamfered portions being slanted to the peripheral top surface thereof toward the respective throttles; and the adjacent first lands are arranged with circumferentially different widths such that the throttles on both sides of the oil drain chambers are of a larger width relative to the throttles on both sides of the oil supply chambers.

12. The hydraulic pressure control valve according to claim 11, wherein each of the chamfered portions slanted toward the throttles are on both sides of the oil supply chambers.

13. A hydraulic pressure control valve comprising:

a cylindrical valve body having first oil grooves and first lands alternately provided on and along the peripheral inside surface; and a cylindrical valve spool coaxially fitted in the valve body to allow a relative angular displacement therebetween, the valve spool having second oil grooves arranged in zigzag positions with the first oil grooves and second lands alternately provided with the second oil grooves on and along the peripheral outside surface;

wherein the second oil grooves constitute oil supply chambers connected to an oil supply source and oil drain chambers connected to an oil drain end, and the first oil grooves constitute oil transfer chambers connected to the oil transfer end through the oil supply chambers and the oil drain chambers on both sides thereof, each of the first and second adjacent oil grooves constituting throttles therebetween, and the throttling extent being changeable in accordance with the relative angular displacement of said spool relative to said valve body;

each of the first lands having chamfered portions at the corners, the chamfered portions being slanted to the peripheral top surface thereof toward the respective throttles; and the second lands are circumferentially provided in an offset arrangement such that the throttles on both sides of the oil drain chambers are of larger width relative to the throttles on both sides of the oil supply chambers.

14. The hydraulic pressure control valve according to claim 13, wherein each of the chamfered portions slanted toward the throttles are on both sides of the oil supply chambers.

15. A hydraulic pressure control valve comprising:

a cylindrical valve body having first oil grooves and first lands alternately provided on and along the peripheral inside surface; and a cylindrical valve spool coaxially fitted in the valve body so as to allow a relative angular displacement therebetween, the valve spool having second oil grooves arranged with an equal pitch in zigzag positions with the first oil grooves, and second lands provided alternately with the second oil grooves on and along the peripheral outside surface;

wherein the second oil grooves constitute oil supply chambers connected to an oil supply source and oil drain chambers connected to an oil drain end, and the first oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the first lands having chamfered portions at the corners, the chamfered portions being slanted to the peripheral top surface thereof toward the respective throttles; and the adjacent second oil grooves are arranged with circumferentially different widths such that the throttles on both sides of the oil drain chambers are of larger width relative to the throttles on both sides of the oil supply chambers.

16. The hydraulic pressure control valve according to claim 15, wherein each of the chamfered portions slanted toward the throttles are on both sides of the oil supply chambers.

17. A hydraulic pressure control valve comprising:

a cylindrical valve body having first oil grooves and first lands alternately provided on and along the peripheral inside surface; and a cylindrical valve spool coaxially fitted in the valve body to allow a relative angular displacement therebetween, the valve spool having second oil grooves arranged in zigzag positions with the first oil grooves, and second lands alternately provided with the second oil grooves on and along the peripheral outside surface;

wherein the first oil grooves constitute oil supply chambers connected to an oil supply source and oil drain chambers connected to an oil drain end, and the second oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement of said spool relative to said valve body;

each of the second lands having chamfered portions at the corners, the chamfered portions being slanted to the peripheral top surface thereof toward the respective throttles; and the first lands are circumferentially provided in an offset arrangement such that the throttles on both sides of the oil drain chambers are of larger width relative to the throttles on both sides of the oil supply chambers.

18. The hydraulic pressure control valve according to claim 17, wherein each of the chamfered portions slanted toward the throttles are on both sides of the oil supply chambers.

19. A hydraulic pressure control valve comprising:

a cylindrical valve body having first oil grooves and first lands provided with an equal pitch alternately with the first oil grooves on and along the peripheral inside surface; and a cylindrical valve spool coaxially fitted in the valve body to allow a relative angular displacement therebetween, the valve spool having second oil grooves arranged in zigzag positions with the first oil grooves, and second lands alternately provided with the second oil grooves on and along the peripheral outside surface;

wherein the first oil grooves constitute oil supply chambers connected to an oil supply source and oil drain chambers connected to an oil drain end, and the second oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement of said spool relative to said valve body;

each of the second lands having chamfered portions at the corners, the chamfered portions being slanted to the peripheral top surface thereof toward the respective throttles; and the adjacent first oil grooves are arranged with circumferentially different widths such that the throttles on both sides of the oil drain chambers are of larger width relative to the throttles on both sides of the oil supply chambers.

20. The hydraulic pressure control valve according to claim 19, wherein each of the chamfered portions slanted toward the throttles are on both sides of the oil supply chambers.

21. A hydraulic pressure control valve comprising:

a cylindrical valve body having first oil grooves and first lands alternately provided on and along the peripheral inside surface; and a cylindrical valve spool coaxially fitted in the valve body to allow a relative angular displacement therebetween, the valve spool having second oil grooves arranged in zigzag positions with the first oil grooves, and second lands alternately provided with the second oil grooves on and along the peripheral outside surface;

wherein the first oil grooves constitute oil supply chambers connected to an oil supply source and oil drain chambers connected to an oil drain end, and the second oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement of said spool relative to said valve body;

each of the second lands having chamfered portions at the corners, the chamfered portions being slanted to the peripheral top surface thereof toward the respective throttles; and the second oil grooves are circumferentially provided in an offset arrangement such that the throttles on both sides of the oil drain chambers are of wider width relative to the throttles on both sides of the oil supply chambers.

22. The hydraulic pressure control valve according to claim 21, wherein each of the chamfered portions slanted toward the throttles are on both sides of the oil supply chambers.

23. A hydraulic pressure control valve comprising:

a cylindrical valve body having first oil grooves and first lands alternately provided on and along the peripheral inside surface; and a cylindrical valve spool coaxially fitted in the valve body so as to allow a relative angular displacement therebetween, the valve spool having second oil grooves arranged with an equal pitch in zigzag positions with the first oil grooves, and second lands provided alternately with the second oil grooves on and along the peripheral outside surface;

wherein the first oil grooves constitute oil supply chambers connected to an oil supply source and oil drain chambers connected to an oil drain end, and the second oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the second lands having chamfered portions at the corners, the chamfered portions being slanted to the peripheral top surface thereof toward the respective throttles; and the adjacent second oil grooves are arranged with circumferentially different widths such that the throttles on both sides of the oil drain chambers are of larger width relative to the throttles on both sides of the oil supply chambers.

24. The hydraulic pressure control valve according to claim 23, wherein each of the chamfered portions slanted toward the throttles are on both sides of the oil supply chambers.

25. A hydraulic pressure control valve comprising:

a cylindrical valve body having first oil grooves and first lands alternately provided on and along the peripheral inside surface; and a cylindrical valve spool coaxially fitted in the valve body to allow a relative angular displacement therebetween, the valve spool having second oil grooves arranged in zigzag positions with the first oil grooves and second lands provided alternately with the second oil grooves on and along the peripheral outside surface;

wherein the first oil grooves constitute oil supply chambers connected to an oil supply source and oil drain chambers connected to an oil drain end, and the second oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the first lands having chamfered portions at the corners, the chamfered portions being slanted to the peripheral top surface thereof toward the respective throttles; and the first lands are circumferentially provided in an offset arrangement such that the throttles on both sides of the oil supply chambers are of larger width relative to the throttles on both sides of the oil drain chambers.

26. The hydraulic pressure control valve according to claim 25, wherein each of the chamfered portions slanted toward the throttles are on both sides of the oil drain chambers.

27. A hydraulic pressure control valve comprising:

a cylindrical valve body having first oil grooves and first lands provided with an equal pitch alternately with the first oil grooves on and along the peripheral inside surface; and a cylindrical valve spool coaxially fitted in the valve body to allow a relative angular displacement therebetween, the valve spool having second oil grooves arranged in zigzag positions with the first oil grooves, and second lands alternately provided with the second oil grooves on and along the peripheral outside surface;

wherein the first oil grooves constitute oil supply chambers connected to an oil supply source and oil drain chambers connected to an oil drain end, and the second oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the first lands having chamfered portions at the corners, the chamfered portions being slanted to the peripheral top surface thereof toward the respective throttles; and the adjacent first oil grooves are arranged with circumferentially different widths such that the throttles on both sides of the oil supply chambers are of larger width relative to the throttles on both sides of the oil drain chambers.

28. The hydraulic pressure control valve according to claim 27, wherein each of the chamfered portions slanted toward the throttles are on both sides of the oil drain chambers.

29. A hydraulic pressure control valve comprising:

a cylindrical valve body having first oil grooves and first lands alternately provided on and along the peripheral inside surface; and a cylindrical valve spool coaxially fitted in the valve body to allow a relative angular displacement therebetween, the valve spool having second oil grooves arranged in zigzag positions with the first oil grooves, and second lands alternately provided with the second oil grooves on and along the peripheral outside surface;

wherein the first oil grooves constitute oil supply chambers connected to an oil supply source and oil drain chambers connected to an oil drain end, and the second oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the first lands having chamfered portions at the corners, the chamfered portions being slanted to the peripheral top surface thereof toward the respective throttles; and the second oil grooves are circumferentially provided in an offset arrangement such that the throttles on both sides of the oil supply chambers are of larger width relative to the throttles on both sides of the oil drain chambers.

30. The hydraulic pressure control valve according to claim 29, wherein each of the chamfered portions slanted toward the throttles are on both sides of the oil drain chambers.

31. A hydraulic pressure control valve comprising:

a cylindrical valve body having first oil grooves and first lands alternately provided on and along the peripheral inside surface; and a cylindrical valve spool coaxially fitted in the valve body so as to allow a relative angular displacement therebetween, the valve spool having second oil grooves arranged with an equal pitch in zigzag positions with the first oil grooves, and second lands provided alternately with the second oil grooves on and along the peripheral outside surface;

wherein the first oil grooves constitute oil supply chambers connected to an oil supply source and oil drain chambers connected to an oil drain end, and the second oil grooves constitute oil transfer chambers connected to the oil transfer end through the oil supply chambers and the oil drain chambers on both sides thereof, each of the first and second adjacent oil grooves constituting throttles therebetween, the throttling extent being changeable in accordance with the relative angular displacement between said spool and said valve body;

each of the first lands having chamfered portions at the corners, the chamfered portions being slanted to the peripheral top surface thereof toward the respective throttles; and the adjacent second lands are arranged with circumferentially different widths such that the throttles on both sides of the oil supply chambers are of larger width relative to the throttles on both sides of the oil drain chambers.

32. The hydraulic pressure control valve according to claim 31, wherein each of the chamfered portions slanted toward the throttles are on both sides of the oil drain chambers.

* * * * *